US010859007B2

(12) United States Patent
Mohlin

(10) Patent No.: US 10,859,007 B2
(45) Date of Patent: Dec. 8, 2020

(54) INTERNAL COMBUSTION ENGINE AND A METHOD FOR CONTROLLING A BRAKING TORQUE OF THE ENGINE

(71) Applicant: VOLVO TRUCK CORPORATION, Gothenburg (SE)

(72) Inventor: Anders Mohlin, Kungsbacka (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 72 days.

(21) Appl. No.: 16/333,249

(22) PCT Filed: Oct. 6, 2016

(86) PCT No.: PCT/EP2016/073859
§ 371 (c)(1),
(2) Date: Mar. 14, 2019

(87) PCT Pub. No.: WO2018/065053
PCT Pub. Date: Apr. 12, 2018

(65) Prior Publication Data
US 2019/0249606 A1    Aug. 15, 2019

(51) Int. Cl.
*F02D 13/04*    (2006.01)
*F01L 1/08*    (2006.01)
(Continued)

(52) U.S. Cl.
CPC .............. *F02D 13/04* (2013.01); *F01L 1/08* (2013.01); *F01L 1/181* (2013.01); *F01L 13/065* (2013.01);
(Continued)

(58) Field of Classification Search
CPC . F01L 13/065; F01L 1/08; F01L 1/181; F01L 1/34; F01L 2013/105;
(Continued)

(56) References Cited

U.S. PATENT DOCUMENTS

| 5,146,890 A | 9/1992 | Gobert et al. |
| 6,694,933 B1 * | 2/2004 | Lester ................. F01L 13/0031 123/198 F |

(Continued)

FOREIGN PATENT DOCUMENTS

| DE | 102011011251 A1 | 8/2011 |
| EP | 1803913 A2 | 7/2007 |

(Continued)

OTHER PUBLICATIONS

International Search Report (Jun. 21, 2017) for corresponding International App. PCT/EP2016/073859.

*Primary Examiner* — Carl C Staubach
(74) *Attorney, Agent, or Firm* — Venable LLP; Jeffri A. Kaminski

(57) ABSTRACT

An internal combustion engine includes a cylinder including a piston connected to a rotatable crankshaft, an air guide arranged to guide an air flow to the cylinder an adjustable air flow restriction element arranged to restrict the How through the air guide, an exhaust guide being arranged to guide a gas flow from the cylinder, an adjustable exhaust flow restriction element arranged to restrict the flow through the exhaust guide, an exhaust valve arranged to control a communication between the cylinder and the exhaust guide, and an exhaust valve actuation assembly for actuating the exhaust valve so as to perform in each of a plurality of cycles of the cylinder an exhaust valve actuation sequence, wherein the exhaust valve actuation assembly is adapted to control the commencement of the exhaust valve actuation sequence to occur selectively at any crankshaft angle within a non-zero crankshaft angle interval.

16 Claims, 12 Drawing Sheets

(51) Int. Cl.
*F01L 1/18* (2006.01)
*F01L 13/06* (2006.01)
*F02D 9/06* (2006.01)
*F02D 41/12* (2006.01)
*F02D 13/02* (2006.01)
*F02D 9/02* (2006.01)
*F02D 41/00* (2006.01)
*F01N 13/10* (2010.01)
*F01L 1/34* (2006.01)

(52) U.S. Cl.
CPC ............. *F02D 9/02* (2013.01); *F02D 9/06* (2013.01); *F02D 13/0249* (2013.01); *F02D 41/0007* (2013.01); *F02D 41/12* (2013.01); *F01L 1/34* (2013.01); *F01L 2305/00* (2020.05); *F01L 2800/00* (2013.01); *F01N 13/107* (2013.01); *F01N 2240/36* (2013.01); *F01N 2590/08* (2013.01); *F02D 2009/0242* (2013.01); *F02D 2200/101* (2013.01); *F02D 2700/04* (2013.01)

(58) Field of Classification Search
CPC . F01L 2305/00; F01L 2800/00; F01N 13/107; F01N 2240/36; F01N 2590/08; F02D 13/0249; F02D 13/04; F02D 2009/0242; F02D 2200/101; F02D 2700/04; F02D 41/0007; F02D 41/12; F02D 9/02; F02D 9/06
See application file for complete search history.

(56) References Cited

U.S. PATENT DOCUMENTS

| | | | |
|---|---|---|---|
| 6,810,850 B2* | 11/2004 | Anderson | F02D 9/06 123/323 |
| 7,712,449 B1* | 5/2010 | Schwoerer | F01L 13/065 123/321 |
| 8,924,131 B2 | 12/2014 | Kowalkowski et al. | |
| 2003/0221663 A1* | 12/2003 | Vanderpoel | F01L 13/065 123/321 |
| 2005/0211206 A1* | 9/2005 | Ruggiero | F02D 9/06 123/90.16 |
| 2006/0060166 A1* | 3/2006 | Huang | F02D 9/06 123/321 |
| 2007/0144472 A1* | 6/2007 | Yang | F01L 13/085 123/90.16 |
| 2010/0170472 A1* | 7/2010 | Yang | F01L 13/065 123/321 |
| 2010/0217504 A1 | 8/2010 | Fujii et al. | |
| 2012/0017869 A1 | 1/2012 | Rammer et al. | |
| 2013/0213350 A1 | 8/2013 | Watanabe et al. | |
| 2014/0214308 A1 | 7/2014 | Mulloy et al. | |
| 2016/0169127 A1 | 6/2016 | Rammer et al. | |
| 2018/0363567 A1* | 12/2018 | Mohlin | F01L 1/267 |
| 2020/0200103 A1* | 6/2020 | Mohlin | F02D 13/04 |

FOREIGN PATENT DOCUMENTS

| | | |
|---|---|---|
| EP | 2598727 B1 | 6/2013 |
| GB | 2443419 A | 5/2008 |
| WO | 2006023375 A2 | 3/2006 |
| WO | 2008008005 A1 | 1/2008 |

* cited by examiner

INTERNAL COMBUSTION ENGINE AND A METHOD FOR CONTROLLING A BRAKING TORQUE OF THE ENGINE

BACKGROUND AND SUMMARY

The invention relates to an internal combustion engine, a vehicle, a method for controlling an internal combustion engine, a computer program, a computer readable medium, and a control unit.

The invention can be applied in heavy-duty vehicles, such as trucks, buses and construction equipment. Although the invention will be described with respect to a heavy-duty vehicle, the invention is not restricted to this particular vehicle, but may also be used in other vehicles such as a car.

It may be desirable to provide, in particular in heavy-duty vehicles, a powerful engine braking function, e.g. in long downhill road stretches with heavy loads. U.S. Pat. No. 5,146,890A describes an engine with a throttling device in the exhaust system so as to increase the back-pressure therein. U.S. Pat. No. 5,146,890A also describes the provision of exhaust valve opening sequences at the beginning and the end of the compression stroke so as to provide a pressure charge in the cylinder and to avoid a push-back effect at the end of the compression stroke, respectively.

However, during the engine braking operation, there may be changes in the circumstances which reduce the braking power, or which entail risks of damaging the engine due to design limits being exceeded. Although the solution in U.S. Pat. No. 5,146,890A provides an advantageous increment of the engine braking power, design limits require relatively large margins for the braking operation which impede maximization of the braking power.

US2012017369A1 describes a system with a throttle in the exhaust system. The backpressure causes an intermediate opening of the cylinder outlet valves and a rocker arm mechanism keeps the valve open until the exhaust valve main opening sequence occurs. This is disadvantageous since the exhaust valves are open during the entire compression stroke, whereby engine braking power is lost. Also, there is similarly to the solution in U.S. Pat. No. 5,146,890A a disadvantageous need to consider design limits which require relatively large margins for the braking operation which impede maximization of the braking power.

US20160169127 describes engine braking in an internal combustion engine with a cylinder outlet valve decompression brake and a brake flap which is arranged in the exhaust system arranged upstream of a turbocharger exhaust turbine. An engine braking torque is controlled by a level of closure of the brake flap. However, a very small change of the braking flap position may result in a major change of the engine braking torque, making it difficult to achieve during part load engine braking a good disability of a vehicle in which the engine is provided.

It is desirable to increase the braking performance of internal combustion engines in vehicles. It is also desirable to decrease the risks of damage to an engine during a braking operation of the engine. It is also desirable to improve the control of an internal combustion engine braking torque.

According to an aspect of the invention, an internal combustion engine comprises
a cylinder comprising a piston connected to a rotatable crankshaft,
an air guide arranged to guide an air flow to the cylinder,
an adjustable air flow restriction element arranged to restrict the flow through the air guide,
an exhaust guide being arranged to guide a gas flow from the cylinder,
an adjustable flow restriction element arranged to restrict the flow through the exhaust guide,
an exhaust valve arranged to control a communication between the cylinder and the exhaust guide, and
an exhaust valve actuation assembly for actuating the exhaust valve so as to perform in each of a plurality of cycles of the cylinder an exhaust valve actuation sequence,
wherein the exhaust valve actuation assembly is adapted to control the commencement of the exhaust valve actuation sequence to occur selectively at any crankshaft angle within a non-zero crankshaft angle interval.

By the combination of an adjustable exhaust flow restriction element arranged to restrict the flow through the exhaust guide, and an exhaust valve actuation assembly adapted to control the commencement of the exhaust valve actuation sequence to occur selectively at any crankshaft angle within a non-zero crankshaft angle interval, considerable improvements of the control of engine braking operations are obtained. The exhaust flow restriction element and the exhaust valve actuation assembly may complement each other to provide a close control of the engine braking power. The exhaust flow restriction element may for example be set for provide an exhaust guide back pressure and a coarse setting of the engine brake power level, and the exhaust valve actuation assembly may provide a continuous closed loop adjustment to fine tune the cylinder air mass-flow and the cylinder pressure, to closely adjust the engine braking power.

More specifically, the exhaust valve actuation assembly being adapted to control the commencement, i.e. an exhaust valve opening event, of the exhaust valve actuation sequence to occur selectively at any crankshaft angle within a non-zero crankshaft angle interval may provide for the exhaust valve actuation assembly providing a continuous adjustment of the crankshaft angle of the commencement of the exhaust valve actuation sequence. The exhaust flow restriction element adjustment combined with the possibility of continuous adjustment of the crankshaft angle of the commencement of the exhaust valve actuation sequence provides for a high engine braking power capacity combined with a capacity of closely adjusting the mass flow and the cylinder pressure, e.g. in view of a changing engine speed, which is not provided in prior art solutions. The exhaust flow restriction element may in itself provide for a high braking power in a narrow range of engine speeds. The possibility to adjust the commencement of the exhaust valve actuation sequence provides for retaining a high braking power throughout a wide range of engine speeds. I.e. with the combination of the exhaust flow restriction element and the continuously adjustable exhaust valve actuation assembly it is possible to obtain a high braking power throughout a wide range of engine speeds.

The exhaust flow restriction element adjustment combined with the possibility of continuous adjustment of the crankshaft angle of the commencement of the exhaust valve actuation sequence also provides for precisely adjusting the mass flow and the cylinder pressure in response to changing circumstances during the braking operation, so as to reduce or avoid risks of engine design limits being exceeded. Such limits may concern e.g. the cylinder pressure, the turbo rotational speed, or the temperature in the exhaust manifold. Thereby, the risk of damages of breakdown of the engine is reduced.

Also, the improved engine braking operation control and damage avoidance capacity allows an operation which is closer the design limits of the engine. This in turn allows a further increase in the braking power. The improved engine braking control will also provide a smoother, more comfortable and safer engine braking behaviour of a vehicle provided with the engine.

In addition, the adjustable air flow restriction element allows for a control of partial braking torques with a high precision. This allows a good driveability of a vehicle in which the engine is provided. The air guide presents a lower temperature and less pressure fluctuations than the exhaust guide. Also, differing from the exhaust flow restriction, the air flow restriction does not affect the cylinder pressure to any substantial degree. As a result, compared to controlling the exhaust flow, controlling the flow restriction in the air guide will result in a reduced risk of an overreaction of the braking torque to relatively small flow changes.

In summary, the invention provides an improved control of the engine braking operation in view of changing circumstances during the operation. This improved control may provide a high braking power over an increased range of engine parameters, in particular engine speed. Also, the invention provides for adjusting the engine braking operation in order to reduce risks of exceeding engine design limits which entail risks of engine damage. In addition, the invention allows for adjusting the engine braking torque with a high degree of precision.

Preferably, the exhaust flow restriction element, the exhaust valve and the exhaust valve actuation assembly are adapted to provide a backpressure for the engine to provide a braking torque, and the air flow restriction element is adapted to enable controllability of said braking torque. Thereby, the exhaust flow restriction element, the exhaust valve and the exhaust valve actuation assembly may allow a high maximum braking torque at a wide engine speed interval, while the air flow restriction element allows a high degree of control of the braking torque at a partial load operation.

Preferably, where the engine comprises a turbocharger comprising a compressor, the air guide being arranged to guide the air flow from the compressor to the cylinder, the adjustable air flow restriction element is arranged between the compressor and the cylinder. Thereby, the air flow restriction element may operate in a pressure increased by the compressor, allowing a high degree of responsiveness to air flow restriction element adjustments. However, in some embodiments, where the air guide is arranged to guide the air flow to the compressor, the adjustable air flow restriction element may be arranged upstream of the compressor.

Preferably, the air flow restriction element is arranged to provide a plurality of levels of the air flow restriction depending on the adjustment of the air flow restriction element. The air flow restriction element may be adapted to provide the restriction of the air flow restriction element at any level within a non-zero restriction interval. The air flow restriction element may comprise a throttle valve in the air guide. Thereby, a continuous adjustment of the air flow restriction may be provided, which provides for a particularly high level of control over the engine braking torque.

The engine may have one or more cylinders. It is understood that in some embodiments of a multi cylinder engine, a single air guide may be arranged to guide air to all cylinders of the engine, wherein a single air flow restriction element is provided to adjustably provide a restriction of the air flow. However, in some embodiments, the cylinder, the air guide and the air flow restriction element may be a first cylinder, a first air guide and a first air flow restriction element, and the engine may further comprise a second cylinder, a second air guide being arranged to guide an air flow to the second cylinder, and a second adjustable air flow restriction element arranged in the second sir guide to restrict the flow to the second cylinder, wherein the flow to the second cylinder is kept separate from the How to the first cylinder. Thereby, the engine is provided with two air guides, each guiding an air flow to a respective cylinder, or a respective sub-group of cylinders, and each being provided with a respective air flow restriction element.

The crankshaft angle interval, within which the commencement of the exhaust valve actuation sequence may occur selectively at any crankshaft angle, may be such that it is suitable for providing the increased control of the engine braking operation discussed above. For example, said interval may extend over 30-50 crankshaft angle degrees, e.g. 40 crankshaft angle degrees.

Preferably, the exhaust valve actuation assembly comprises a rotatable camshaft arrangement, the camshaft arrangement being adapted to provide the control of the commencement of the exhaust valve actuation sequence to occur selectively at any crankshaft angle within the non-zero crankshaft angle interval. Where the exhaust valve actuation assembly includes a rotatable camshaft, the exhaust valve actuation assembly may be controllable for adjusting the phase of the camshaft rotation in relation of the crankshaft rotation. The exhaust valve actuation assembly may comprise a variator for variable valve timing.

Thereby, a robust arrangement is provided for the control to continuously vary the crankshaft angle of the commencement of the exhaust valve actuation sequence, i.e. to continuously vary the crankshaft angle of an exhaust valve opening event of the exhaust valve actuation sequence. Such a cam phasing variable valve actuation mechanism may provide a reliable embodiment which is simple to implement.

An alternative to cam phasing may be the use of two coaxial camshafts with a respective cam lobe profile which provide a combined cam lobe profile with an adjustable length. Thereby one follower may span the pair of closely spaced cam lobes. By changing the duration of the valve lift by advancing one of the cam lobes in the camshaft rotation direction, an advancement of the commencement of the exhaust valve actuation sequence will also be obtained, and vice versa.

The invention is well-suited for a four-stroke internal combustion engine. The exhaust valve actuation sequence may be a decompression opening sequence of the exhaust valve commenced in a compression stroke of the respective cycle of the cylinder, the exhaust valve actuation assembly being controllable for selectively providing the decompression opening sequence. For this, the exhaust valve actuation assembly may comprise a camshaft presenting at least one cam lobe presenting a decompression nose for the decompression opening sequence, the exhaust valve actuation assembly being controllable for selectively actuating the exhaust valve by means of the decompression nose. Preferably, the decompression opening sequence of the exhaust valve is commenced in a later half of the compression stroke. Thereby, the decompression opening sequence serves to avoid a push-back effect, which the compressed air would otherwise have produced at the end of the compression stroke. In addition, the possibility of continuous adjustment of the crankshaft angle of the commencement of the decompression opening sequence provides for a particularly precise and responsive adjustment of the mass flow and the cylinder pressure in response to changing circumstances during the braking operation, which effectively serves to provide a high braking power over a wide engine speed range, and to reduce or avoid risks of engine design limits being exceeded.

The exhaust valve actuation sequence may be a charging opening sequence of the exhaust valve commenced in a second half of an intake stroke or a first half of a compression stroke of the cylinder, the exhaust valve actuation assembly being controllable for selectively providing the charging opening sequence. For this, the exhaust valve actuation assembly may comprise a camshaft presenting at least one cam lobe presenting a charging nose for the charging opening sequence, the exhaust valve actuation assembly being controllable for selectively actuating the exhaust valve by means of the charging nose. Thereby, when the piston is at its bottom dead centre, and the compression stroke is about to start, the exhaust valve opens for a short time period and the relatively higher pressure in the exhaust guide "charges" the cylinder. As a result of this, the braking effect on the piston during the compression stroke will be considerably higher than without the charge opening sequence. In addition, the possibility of continuous adjustment of the crankshaft angle of the commencement of the charge opening sequence provides for a precise and quick adjustment of the mass flow and the cylinder pressure in response to changing circumstances during the braking operation, which effectively serves to provide a high braking power over a wide engine speed range, and to reduce or avoid risks of engine design limits being exceeded.

Preferably the exhaust flow restriction element is arranged to provide a plurality of levels of the exhaust flow restriction depending on the adjustment of the exhaust flow restriction element. Preferably, the exhaust flow restriction element is adapted to provide the restriction of the exhaust flow restriction element at any level within a non-zero restriction interval. Thereby, a continuous adjustment of the exhaust flow restriction may be provided, which in combination with the continuous adjustment of the exhaust valve actuation provides for a particularly high level of control over the engine braking process.

The exhaust flow restriction element may comprise a throttle valve in the exhaust guide. In some embodiments, an exhaust flow restriction actuation assembly is provided to adjust the exhaust flow restriction element, the exhaust flow restriction element being arranged to assume, upon a fault in the exhaust flow restriction actuation assembly, a position in which the exhaust flow restriction element does not restrict or block the flow from the cylinder to the turbine. For this, the exhaust flow restriction element may be a throttle valve in the form of a butterfly valve with a non-symmetric flap. Thereby, in case of a fault in the exhaust flow restriction actuation assembly, the exhaust guide will be unrestricted and will not impede a later operation in which the engine propels lite vehicle. Thereby a blockage of the exhaust guide in case of a throttle valve malfunction may be avoided, which blockage may make it impossible to continue driving the vehicle, or even lead to an engine breakdown.

The engine may comprise a turbocharger. The turbocharger may comprise a turbine for extracting power from exhaust gases from the cylinder to drive a compressor for charging air to be guided to the cylinder. The exhaust guide is thus arranged to guide the gas flow from the cylinder to the turbine, and the adjustable exhaust flow restriction element is preferably arranged between the cylinder and the turbine. Thus, the exhaust flow restriction element is preferably located upstream of the turbine to restrict the flow from the cylinder to the turbine. Compared to locating the exhaust flow restriction element downstream of the turbine, the upstream location will increase the turbo speed and air mass flow through the engine, whereby the engine braking power may be increased with 50%. The upstream exhaust flow restriction element creates a high back pressure in the exhaust manifold without reducing turbo performance. The upstream location of the exhaust flow restriction element allows the turbocharger to be effective within a larger engine speed range, which in turn increases the available engine speed range controllable by the exhaust valve actuation assembly and the exhaust flow restriction element. Thereby the control provided by the combination of the exhaust valve actuation assembly and the exhaust flow restriction element is further enhanced. Thus, continuous adjustment provided by the exhaust valve actuation assembly and the location of the exhaust flow restriction element between the cylinder and the turbine provides a particularly high engine braking power throughout a large engine speed range. As a result of providing the increase of the turbo speed and the air mass flow, the upstream location of the exhaust flow restriction element will also decrease the exhaust temperature at the turbine.

The cylinder, the exhaust guide and the exhaust flow restriction element may be a first cylinder, a first exhaust guide and a first exhaust flow restriction element, and the engine may further comprise a second cylinder, a second exhaust guide being arranged to guide a gas flow from the second cylinder to the turbine, and a second adjustable exhaust flow restriction element arranged upstream of the turbine to restrict the flow from the second cylinder to the turbine, wherein the flow from the second cylinder to the turbine is kept separate from the flow from the first cylinder to the turbine. Thereby, the engine is provided with two exhaust guides, each guiding a gas flow from a respective cylinder, or a respective sub-group of cylinders, and each being provided with a respective exhaust flow restriction element. This makes it possible to separate in an advantageous manner the exhaust pulses from the cylinders all the way to the turbine. More specifically, it is possible to match the exhaust guides to the cylinders so that the exhaust pulses do not suppress each other before reaching the turbine. In turn this provides for increasing the power of the turbine, in turn increasing the turbo charging pressure and the air mass flow, which increases the engine braking power. Thus, the performance during engine braking of the engine will be improved.

It is understood however that in some embodiments of a multi cylinder engine, a single exhaust guide may be arranged to guide a gas flow from alt cylinders of the engine to a turbine of a turbocharger, wherein a single exhaust flow restriction element is provided to adjustably provide a restriction of the gas flow.

The turbocharger may be a fixed geometry turbocharger with a turbine in one, two or more steps. In some embodiments, the engine comprises a variable geometry turbocharger comprising a turbine, the exhaust guide being arranged to guide the gas flow from the cylinder to the turbine, wherein the turbocharger is arranged to provide at the turbine an adjustable restriction of the gas flow in addition to the restriction which the adjustable exhaust flow restriction element is arranged to provide. Thereby, as exemplified below, a further improvement of the control of the engine braking operation may be provided, with a control of the air mass flow and the cylinder pressure by means of the exhaust valve actuation assembly, the air flow restriction element, the exhaust flow restriction element as well as the variable geometry turbocharger.

In some embodiments, where the engine comprises a variable geometry turbocharger comprising a turbine, the exhaust guide being arranged to guide the gas flow from the cylinder to the turbine, the adjustable exhaust flow restriction element may be provided by a flow adjusting function at the turbine. Thereby, the exhaust flow restriction element may be integrated with the variable geometry turbocharger, which reduces the complexity of the engine.

According to another aspect of the invention, a method is provided of controlling an internal combustion engine in a vehicle comprising a cylinder, a fuel system for supplying fuel to the cylinder, an air guide arranged to guide an air flow to the cylinder, an exhaust guide arranged to guide a gas flow from the cylinder, an exhaust valve arranged to control a communication between the cylinder and the exhaust guide, the method comprising
controlling the engine to provide a braking torque, the control comprising,
terminating the supply of fuel to the cylinder,
restricting the flow through the exhaust guide,
restricting the flow through the air guide, and
performing in each of a plurality of cycles of the cylinder an exhaust valve actuation sequence,
the control of the engine to provide a braking torque also comprising
determining a value of an engine parameter affecting the pressure in the cylinder and/or the air mass flow through the cylinder,
in dependence on the determined engine parameter value adjusting the timing of a commencement of the exhaust valve actuation sequence, and
in dependence on at least one of the at least one determined engine parameter value adjusting the restriction of the flow through the air guide.

The method may be advantageously performed in a four stroke internal combustion engine. It is understood that the method may include control of the engine braking torque to a drivetrain of the vehicle. The engine may comprise a turbo changer comprising a turbine, the exhaust guide being arranged to guide the gas flow from the cylinder to the turbine. It is understood that restricting the flow through the exhaust guide may comprise adjusting an adjustable exhaust flow restriction element arranged to restrict the flow through the exhaust guide. It is also understood that restricting the flow-through the air guide may comprise adjusting an adjustable air flow restriction element arranged to restrict the flow through the air guide.

Similarly to the engine described above, the combination of the restriction of the flow through the exhaust guide, and the adjustment of the timing of the commencement of the exhaust valve actuation sequence in dependence on the determined value of the engine parameter affecting the pressure in the cylinder and/or the air mass flow through the cylinder, provides for retaining a high braking power throughout a wide range of engine speeds. Also, said combination provides for reducing or avoiding risks of engine design limits being exceeded. Also similarly to the engine described above, the adjustable air flow restriction element allows for a control of partial braking torques with a high precision. Controlling the flow restriction in the air guide will result in a reduced risk of an overreaction of the braking torque to relatively small flow changes.

Preferably, adjusting the timing of the commencement of the exhaust valve actuation sequence comprises adjusting the crankshaft angle at which the exhaust valve actuation sequence is commenced. Preferably, apart from the crankshaft angle at which the exhaust valve actuation sequence is commenced, the exhaust valve actuation sequence during one of the cycles is identical to the exhaust valve actuation sequence during another of the cycles. Such an adjustment may be advantageously provided by a camshaft phasing solution described above.

Preferably, each of the at least one the engine parameter is one of the engine rotational speed, a requested engine braking torque, a current engine braking torque, a pressure in the air guide, a rotational speed of a turbocharger of the engine, and a pressure in the exhaust guide. By using any of these parameters for adjusting the timing of the commencement of the exhaust valve actuation sequence and for adjusting the restriction of the flow through the air guide, an effective control of the air mass flow and the cylinder pressure may be provided. For example, the exhaust valve actuation sequence may be performed during a first cycle of the cylinder at a first rotational speed of the engine, and the exhaust valve actuation sequence may also be performed during a second cycle of the cylinder at a second rotational speed of the engine, the second rotational speed being higher than the first rotational speed, the exhaust valve actuation sequence being performed at a lower crankshaft angle in the second cycle than in the first cycle. Thereby, the mass flow and cylinder pressure may be effectively controlled despite a varying engine speed.

Preferably, adjusting the restriction of the flow through the air guide comprises adjusting a throttle valve in the air guide. Thereby a simple and effective way of obtaining a high precision partial engine brake torque may be provided.

Preferably, the adjustment of the restriction of the flow through the air guide is a closed loop adjustment. The feedback parameter for such a closed loop control may be any suitable parameter, such as the air guide pressure or the air guide mass flow. Thus, a pressure in the air guide may be a feedback parameter in the closed loop adjustment. Where a compressor is provided in the air guide, preferably the boost pressure in the air guide is a feedback parameter. In some embodiments, a pressure in the exhaust guide, preferably upstream of the restriction of the flow through the exhaust guide, is a feedback parameter in the closed loop adjustment. In some embodiments, a pressure difference across the cylinder is a feedback parameter in the closed loop adjustment. Adjusting the timing of the commencement of the exhaust valve actuation sequence may comprise adjusting the crankshaft angle at which the exhaust valve actuation sequence is commenced. The adjustment of the timing of the commencement of the exhaust valve actuation sequence may be an open loop adjustment. As exemplified below, the exhaust flow restriction and the timing of the commencement of the exhaust valve actuation sequence may be adapted in open loop control algorithms to provide a backpressure for the engine to provide a braking torque, and the air flow restriction may be adjusted in a closed loop to provide a high precision control of the braking torque at partial load.

Alternatively, the adjustment of the timing of the commencement of the exhaust valve actuation sequence and/or the adjustment of the restriction of the flow through the exhaust guide may be a closed loop adjustment. Thereby, a pressure in the air guide may be a feedback parameter in the closed loop adjustment. Where a compressor is provided in the air guide, preferably the boost pressure in the air guide is a feedback parameter. In some embodiments, a pressure in the exhaust guide, preferably upstream of the restriction of the flow through the exhaust guide, is a feedback parameter in the closed loop adjustment. In some embodiments, a pressure difference across the cylinder is a feedback parameter in the closed loop adjustment.

Preferably, the method comprises determining a value of a further engine parameter affecting the pressure in the cylinder and/or the air mass flow through the cylinder, and in dependence on the determined further engine parameter value adjusting the restriction of the How through the exhaust guide. The further engine parameter may be the engine rotational speed, the engine torque, a pressure in an air guide arranged to guide an air flow from a compressor of a turbocharger of the engine to die cylinder, a rotational speed of the turbocharger, or a pressure in the exhaust guide. Thereby, the exhaust flow restriction, the air flow restriction as well as the timing of the commencement of the exhaust valve actuation sequence may be effectively controlled based on parameters affecting the pressure in the cylinder and/or the air mass flow through the cylinder. This will provide a particularly high level of control of the engine braking operation. As exemplified below, one or two of the exhaust flow restriction, the air flow restriction and the timing of the commencement of the exhaust valve actuation sequence may be subjected to an open loop control while the remaining of the exhaust flow restriction, the air flow restriction and the timing of the commencement of the exhaust valve actuation sequence may be advantageously subjected to a closed loop control. It is also conceivable within the scope of an aspect of the invention to arrange all of the exhaust flow restriction, the air flow restriction and the timing of the commencement of the exhaust valve actuation sequence to be subjected to an open loop control. It is further conceivable within the scope of an aspect of the invention to arrange all of the exhaust flow restriction, the air flow restriction and the timing of the commencement of the exhaust valve actuation sequence to be subjected to a closed loop control.

As understood from the description of the engine above, restricting the flow through the exhaust guide may comprise adjusting a throttle valve in the exhaust guide, and/or adjusting a flow adjustment function at a turbine of a variable geometry turbocharger of the engine, wherein the exhaust guide is arranged to guide the gas flow from the cylinder to the turbine.

The exhaust valve actuation sequence may comprise a decompression opening sequence commenced in a compression stroke of the cylinder. The exhaust valve actuation sequence may also comprise a charging opening sequence of the exhaust valve commenced in a second half of an intake stroke or a first half of a compression stroke of the cylinder. Preferably the method comprises reducing the degree of opening of the exhaust valve between the charging opening sequence and the decompression opening sequence. Preferably the method comprises fully closing the exhaust valve between the charging opening sequence and the decompression opening sequence. Thereby the braking power may be increased or maximized at the compression stroke, since a reduced or no communication is provided between the cylinder and the exhaust guide, allowing a very high pressure to build up in the cylinder.

It is understood that that the exhaust valve actuation sequence may comprise a main opening sequence of the exhaust valve with a maximum degree of opening of the exhaust valve in an exhaust stroke of the cylinder.

As suggested above, the method may comprise, in dependence on at least one of the at least one determined engine parameter value, adjusting the restriction of the flow through the exhaust guide. The adjustment of the restriction of the flow through the exhaust guide is advantageously done in an open loop adjustment. Restricting the flow through the exhaust guide may comprise adjusting a throttle valve in the exhaust guide, and or adjusting a flow adjustment function at a turbine of a variable geometry turbocharger of the engine, wherein the exhaust guide is arranged to guide the gas flow from the cylinder to the turbine.

According to another aspect of the invention, an internal combustion engine comprises a cylinder comprising a piston connected to a rotatable crankshaft,
an air guide arranged to guide an air flow to the cylinder,
an adjustable air flow restriction element arranged to restrict the flow through the air guide,
an exhaust guide being arranged to guide a gas flow from the cylinder,
an exhaust valve arranged to control a communication between the cylinder and the exhaust guide, and
an exhaust valve actuation assembly for actuating the exhaust valve so as to perform in each of a plurality of cycles of the cylinder an exhaust valve actuation sequence,
wherein the exhaust valve actuation assembly is adapted to control the commencement of the exhaust valve actuation sequence to occur selectively at any crankshaft angle within a non-zero crankshaft angle interval.

The adjustment of the timing of a commencement of the exhaust valve actuation sequence may provide a high engine brake power, and an adjustment of the air flow restriction element may provide a high degree of control of the engine brake power at partial load. Preferably, where the engine comprises a turbocharger comprising a compressor, the air guide being arranged to guide the air flow from the compressor to the cylinder, the adjustable air flow restriction element is arranged between the compressor and the cylinder. Alternatively, the adjustable air flow restriction element may be arranged upstream of the compressor. Preferably, the air flow restriction element is arranged to provide a plurality of levels of the air flow restriction depending on the adjustment of the air flow restriction element. Preferably, the air flow restriction element is adapted to provide the restriction of the air flow restriction element at any level within a non-zero restriction interval. The air flow restriction element may comprise a throttle valve in the air guide. The exhaust valve actuation assembly may include a rotatable camshaft, wherein the exhaust valve actuation assembly is controllable for adjusting the phase of the camshaft rotation in relation of the crankshaft rotation. The exhaust valve actuation sequence may be a decompression opening sequence of the exhaust valve commenced in a compression stroke of the respective cycle of the cylinder, the exhaust valve actuation assembly being controllable for selectively providing the decompression opening sequence. The exhaust valve actuation sequence may be a charging opening sequence of the exhaust valve commenced in a second half of an intake stroke or a first half of a compression stroke of the cylinder, the exhaust valve actuation assembly being controllable for selectively providing the charging opening sequence.

According to another aspect of the invention, a method is provided of controlling an internal combustion engine in a vehicle comprising a cylinder, a fuel system for supplying fuel to the cylinder, an air guide arranged to guide an air flow to the cylinder, an exhaust guide arranged to guide a gas flow from the cylinder, an exhaust valve arranged to control a communication between the cylinder and the exhaust guide, the method comprising
controlling the engine to provide a braking torque, the control comprising,
terminating the supply of fuel to the cylinder,
restricting the flow through the air guide, and performing in each of a plurality of cycles of the cylinder an exhaust valve actuation sequence, the control of the engine to provide a braking torque also comprising
determining a value of at least one engine parameter affecting the pressure in the cylinder and/or the air mass flow through the cylinder.
in dependence on at least one of the at least one determined engine parameter value adjusting the timing of a commencement of the exhaust valve actuation sequence, and
in dependence on at least one of the at least one determined engine parameter value adjusting the restriction of the flow through the air guide.

The adjustment of the timing of a commencement of the exhaust valve actuation sequence may provide a high engine brake power, and the adjustment of the restriction of the flow through the air guide may provide a high degree of control of the engine brake power at partial load. The at least one the engine parameter may be one of the engine rotational speed, a requested engine braking torque, a current engine braking torque, a pressure in the air guide, a rotational speed of a turbocharger of the engine, and a pressure in the exhaust guide. Adjusting the restriction of the flow through the air guide may comprise adjusting a throttle valve in the air guide. Preferably, the adjustment of the restriction of the flow through the air guide is a closed loop adjustment. Preferably, adjusting the timing of the commencement of the exhaust valve actuation sequence comprises adjusting the crankshaft angle at which the exhaust valve actuation sequence is commenced. Preferably, the adjustment of the timing of the commencement of the exhaust valve actuation sequence is an open loop adjustment. The exhaust valve actuation sequence may comprise a decompression opening sequence commenced in a compression stroke of the cylinder. The exhaust valve actuation sequence may comprise a charging opening sequence of the exhaust valve commenced in a second half of an intake stroke or a first half of a compression stroke of the cylinder.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
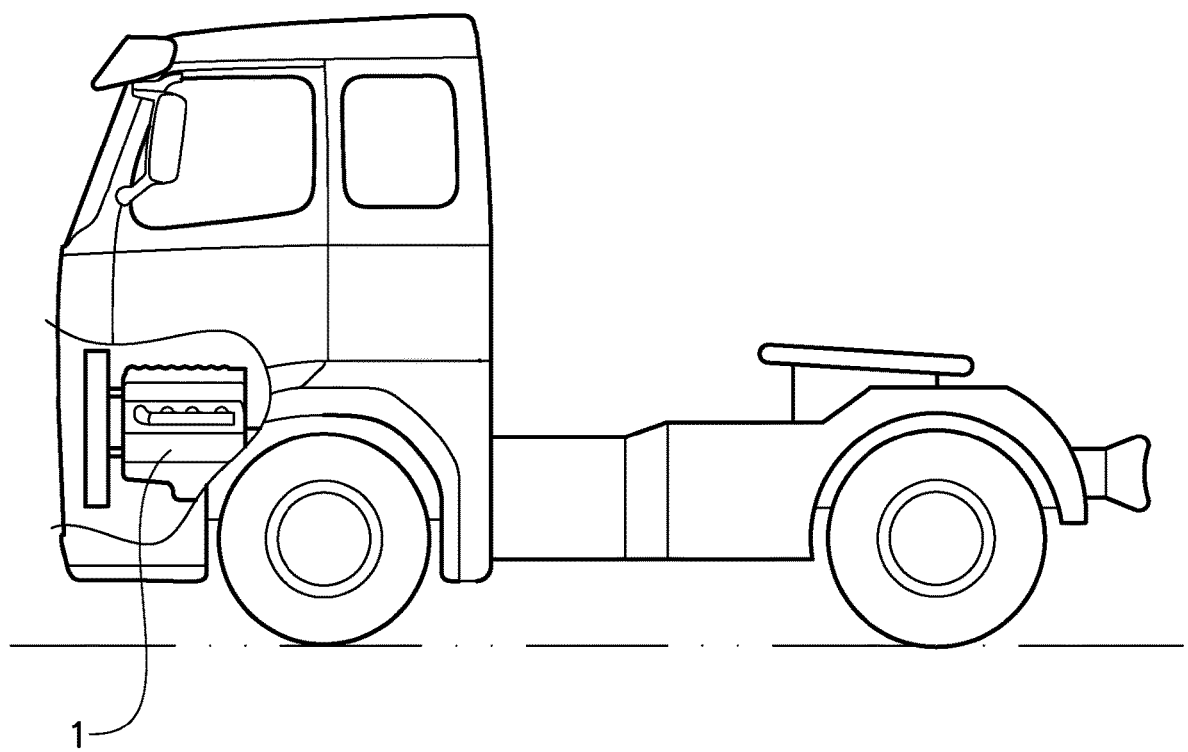
FIG. 1 is a side view of a vehicle in the form of a truck.

FIG. 1 shows a vehicle in the form of a truck, or a tractor for a semitrailer. It should be noted that the vehicle can be of a variety of alternative types, e.g. it may be a car, a bus, or a working machine such as a wheel loader. The vehicle comprises a four-stroke internal combustion engine 1.

Figure 2:
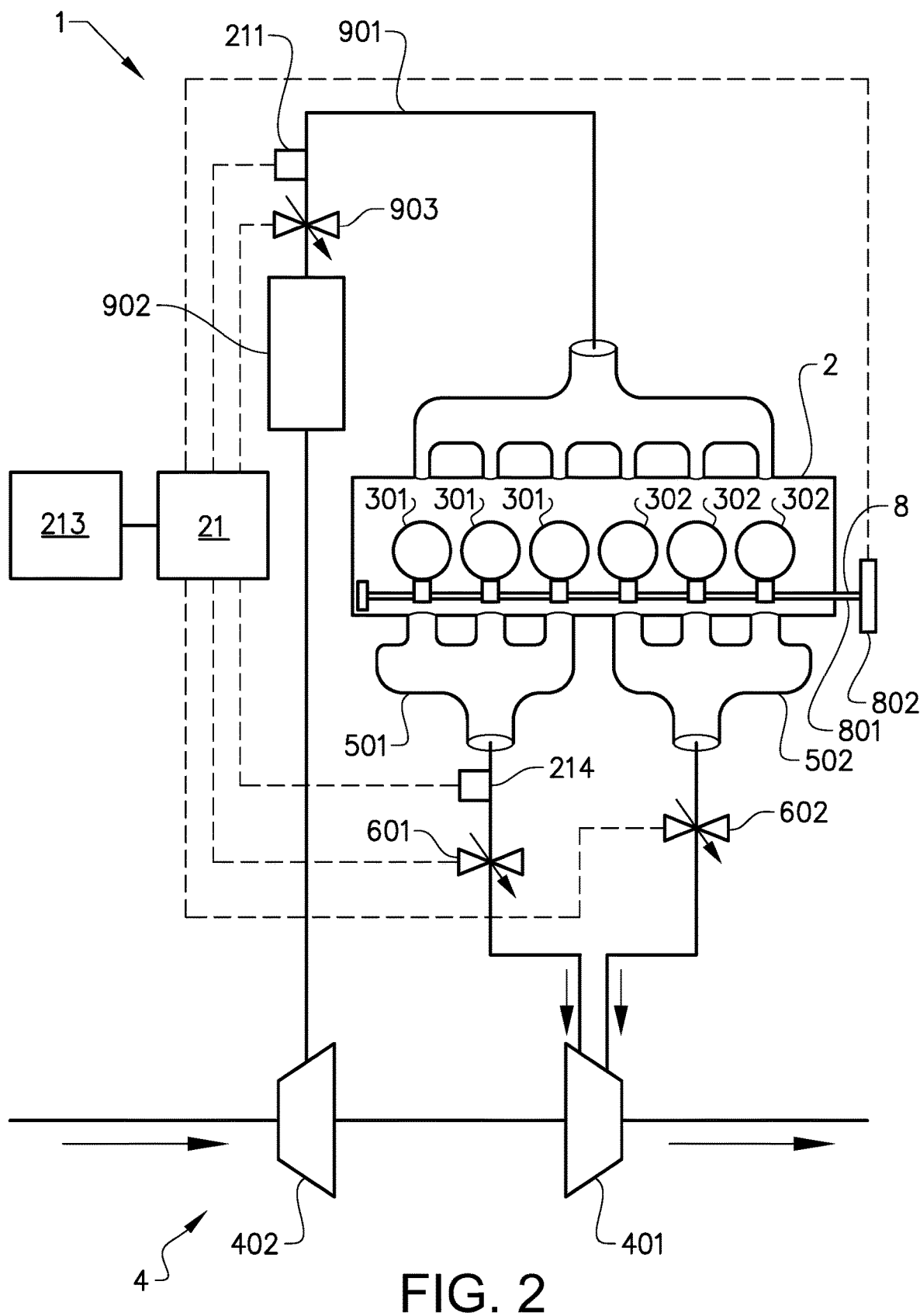
FIG. 2 is a schematic drawing of an internal combustion engine in the vehicle in FIG. 1.

As can be seen in FIG. 2, the engine in this example comprises six cylinders 301, 302 arranged in a line. The engine 1 is oriented in the vehicle such that line of cylinders is parallel with the direction of straight travel of the vehicle. It should be noted however that in alternative embodiments the orientation of the engine may have another orientation in the vehicle. For example it may be a transverse engine, i.e. an engine installed such that the crankshaft of the engine is perpendicular to the direction of straight travel of the vehicle. This may be the case e.g. in a bus, where the engine may be a transverse engine mounted in the rear of the bus, The cylinders include first cylinders 301 which are the three cylinders located forward in the vehicle direction of forward travel, and second cylinders 302 which are the three cylinders located rearward in the vehicle direction of forward travel.

The engine comprises a turbocharger 4 comprising a turbine 401 in an exhaust conduit arrangement 501, 502 of die engine. The turbocharger 4 also comprises a compressor 402 in an air guide 901 arranged to guide an air flow from the compressor 402 to the cylinders 301, 302 via a charge air cooler 902. The turbine 401 and the compressor 402 are fixedly connected and rotatable, whereby the turbine 401 is arranged to lie driven by gases in the exhaust conduit arrangement 501, 502, to drive the compressor 402 which is arranged to compress air in the air guide 901, as in known per se.

The exhaust conduit arrangement comprises a first exhaust guide 501 arranged to guide a gas flow from the first cylinders 301 to the turbine 401, and a second exhaust guide 502 arranged to guide a gas flow from the second cylinders 302 to the turbine 401. Thereby, the flow from the second cylinders 302 to the turbine 401 is kept separate from the flow from the first cylinders 301 to the turbine.

A control unit 21 is arranged to determine values of engine parameters affecting the pressure in the cylinders and/or the air mass flow through the cylinders 301, 302. These parameters include a requested engine torque determined based on a requested vehicle speed provided from a vehicle speed control function, an actual vehicle speed, and the selected gear ratio of a transmission in the vehicle. The parameters also includes the engine rotational speed, which is determined by means of an engine speed sensor as described below. The engine parameters affecting the pressure in the cylinders and/or the air mass flow further includes the pressure in the air guide 901, determined by means of signals from an air guide pressure sensor 211. Also, the control unit 21 is arranged to determine the pressure in the exhaust guides 501, 502 based on signals from an exhaust guide pressure sensor 214 in the first exhaust guide 501. Alternatively, an additional exhaust guide pressure sensor may be provided in the second exhaust guide 502, or an exhaust guide pressure sensor may be provided in the second exhaust guide 502 only. Further, the control unit 21 is arranged to access a data storage unit 213 provided with data correlating values of the engine torque and the engine rotational speed with desired values of the air guide pressure.

An adjustable air flow restriction element, comprising a throttle valve 903 in the air guide 901, is arranged to restrict the flow through the air guide 901. The adjustable air flow restriction element 903 is arranged between the compressor 402 and the cylinders 301, 302, more specifically, between the charge air cooler 902 and the cylinders 301, 302. The air guide pressure sensor 211 is located between the adjustable air flow restriction element 903 and the cylinders 301, 302. In alternative embodiments, the adjustable air flow restriction element 903 may be arranged upstream of the compressor 402.

The air flow restriction element 903 is controllable by the control unit 21 via an air flow restriction actuation assembly (not shown) comprising e.g. a stepper motor. In addition, a position sensor (not shown) at the air flow restriction element 903 is connected to the control unit 21, and arranged to register and send to the control unit signals representative of the position of the air restriction element 903, for a position feedback. It should be noted that any alternative type of air flow restriction actuation assembly may be provided; for example such as assembly may include a brushless motor or a pneumatic motor. The air flow restriction element 903 is adapted to provide the air restriction at any level within a non-zero restriction interval depending on the adjustment of the air flow restriction element 903.

A first adjustable exhaust flow restriction element 601 in the form of a first exhaust throttle valve is arranged in the first exhaust guide 501, between the first cylinders 301 and the turbine 401. The exhaust guide pressure sensor 214 is located between the first adjustable exhaust flow restriction element 601 and the cylinders 301. A second adjustable exhaust flow restriction element 602 in the form of a second exhaust throttle valve is arranged in the second exhaust guide 502, between the second cylinders 302 and the turbine 401. The first and second exhaust flow restriction elements are provided as "draw bridge" valves, which may be arranged to not provide any obstacle to the flow when fully open. Each valve 601, 602 may be provided in a unit which is bolted onto the respective exhaust guide 501, 502. It should be noted however, that in alternative embodiments, each valve may be integrated into the respective exhaust guide. In a further alternative, a valve may be integrated in housing of the turbine. As also mentioned elsewhere herein, a restriction element may be provided by the flow adjustment function of a variable geometry turbocharger. Each of the first and second exhaust flow restriction elements 601, 602 are controllable by the control unit 21 via a respective exhaust flow restriction actuation assembly (not shown) comprising e.g. a stepper motor. In addition, a position sensor (not shown) at each exhaust flow restriction element 601, 602 is connected to the control unit 21, and arranged to register and send to the control unit signals representative of the position of the respective exhaust flow restriction element 601, 602, for a position feedback. It should be noted that any alternative type of exhaust flow restriction actuation assembly may be provided; for example such as assembly may include a brushless motor or a pneumatic motor.

Each of the first and second exhaust flow restriction elements 601, 602 is arranged to provide a plurality of levels of the exhaust flow restriction depending on the adjustment by the control unit 21 of the respective exhaust flow restriction element 601, 602. More specifically each exhaust flow restriction element 601, 602 is arranged to provide a continuous adjustment of the flow, i.e. to provide a flow restriction at any level within a non-zero restriction interval. The data storage unit 213 is provided with data correlating values of the engine torque and the engine rotational speed with settings for the first and second exhaust flow restriction elements 601, 602.

It should be noted that in alternative embodiments, a single exhaust guide may be arranged to guide exhaust gases from all cylinders of the engine. In some embodiments, a single exhaust flow restriction element 601 may be provided downstream of the turbine of the turbocharger. In further embodiments, the turbocharger 4 may be a variable geometry turbocharger, whereby the turbocharger 4 provides, with a flow adjusting function at the turbine 401, the function of the exhaust flow restriction element 601 as described herein.

At each of the cylinders 301, 302 two intake valves (not shown) are provided to control the admission of air from the air guide 901 to the respective cylinder 301, 302. Also, at each of the cylinders two exhaust valves, described closer below, are arranged to control a communication between the respective cylinder 301, 302 and the respective exhaust guide 501, 502. It should be noted that in other embodiments only one or more than two exhaust valves may be provided at each cylinder.

Also, a fuel system (not shown) is provided to inject fuel into the cylinders during cycles thereof, and the fuel injection is controllable by the control unit 21.

The engine 1 comprises an exhaust valve actuation assembly 8 comprising a camshaft arrangement comprising a rotatable camshaft 801. At each cylinder 301, 302 a cam lobe 803 is fixed to the camshaft for actuation of the exhaust valves as described closer below. The exhaust valve actuation assembly 8 also comprises a variator 802 for variable valve timing, more particularly for adjustment of the phase of the camshaft rotation, as described closer below.

Figure 3:
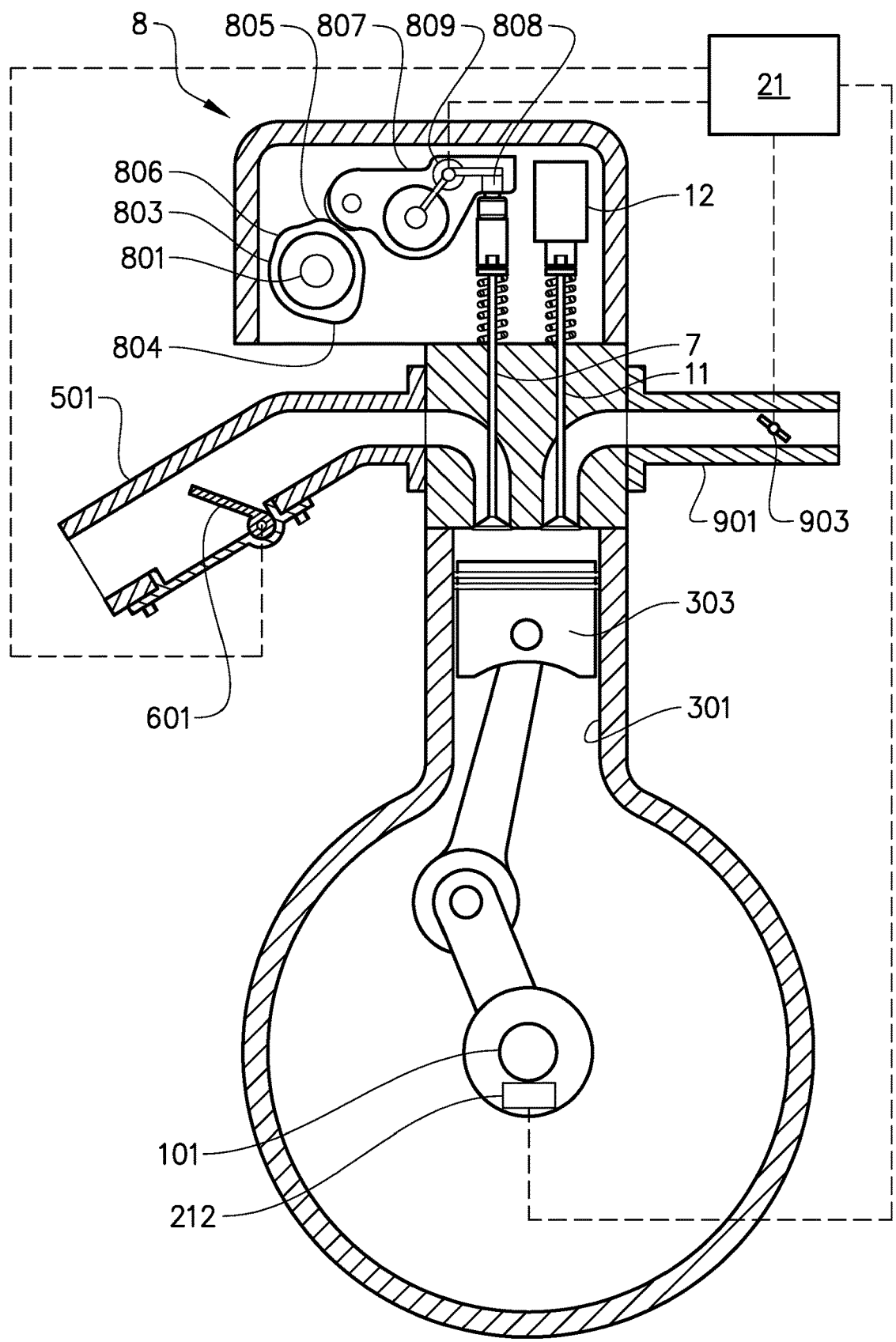
FIG. 3 is a view of a vertical cross-section at a cylinder of the engine in FIG. 2.

Reference is made also to FIG. 3 showing a cross-section through one of the first cylinders 301. Each cylinder 301, 302 comprises a piston 303 connected to a rotatable crankshaft 101. The control unit 21 is arranged to determine the engine speed by means of signals from an engine speed sensor 212 at the crankshaft 101. In alternative embodiments, a sensor may be arranged to detect the speed of the camshaft 801, whereby the crankshaft speed may be obtained by doubling the sensed camshaft speed. FIG. 3 also shows one of the exhaust valves 7 arranged to control the communication between the first cylinder 301 and the first exhaust guide 501. FIG. 3 further shows the first adjustable exhaust flow restriction element 601 in the first exhaust guide 501. In addition, one of the intake valves 11, arranged to control the communication between the first cylinder 301 and the air guide 901, is shown. For actuation of intake valves the engine 1 comprises an intake valve actuation assembly 12 which may comprise a camshaft arrangement with a rotatable camshaft (not show). FIG. 3 also shows the adjustable air flow restriction element 903 in the air guide 901.

The exhaust valve actuation assembly S comprises for each cylinder 301, 302 a rocker arm 807 arranged to pivot by contact at one end with the respective cam lobe 803 to actuate the exhaust valves 7. The cam lobe 803 presents a relatively large main nose 804, and two relatively small noses, i.e. a decompression nose 805 and a charge nose 806.

When the engine propels the vehicle, a distance is provided between on one hand the rocker arm 807 and on the other hand the decompression nose 805 and the charge nose 806. Therefore decompression nose 805 and the charge nose 806 do not provide any exhaust valve actuation when the engine propels the vehicle. However, during engine braking, the rocker arm 807 is in contact with the decompression nose 805 and the charge nose 806, which provide exhaust valve actuation sequences as described below.

The selective engagement of the decompression nose 805 and the charge nose 806 is provided by a hydraulic piston 808 at an end of the rocker arm 807 opposite to the end at which the rocker arm 807 is in contact with the cam lobe 803. The hydraulic piston 808 is controlled by a hydraulic conduit system and a control valve 809 in each rocker arm 807, each control valve 809 being controllable by the control unit 21.

Figure 4:
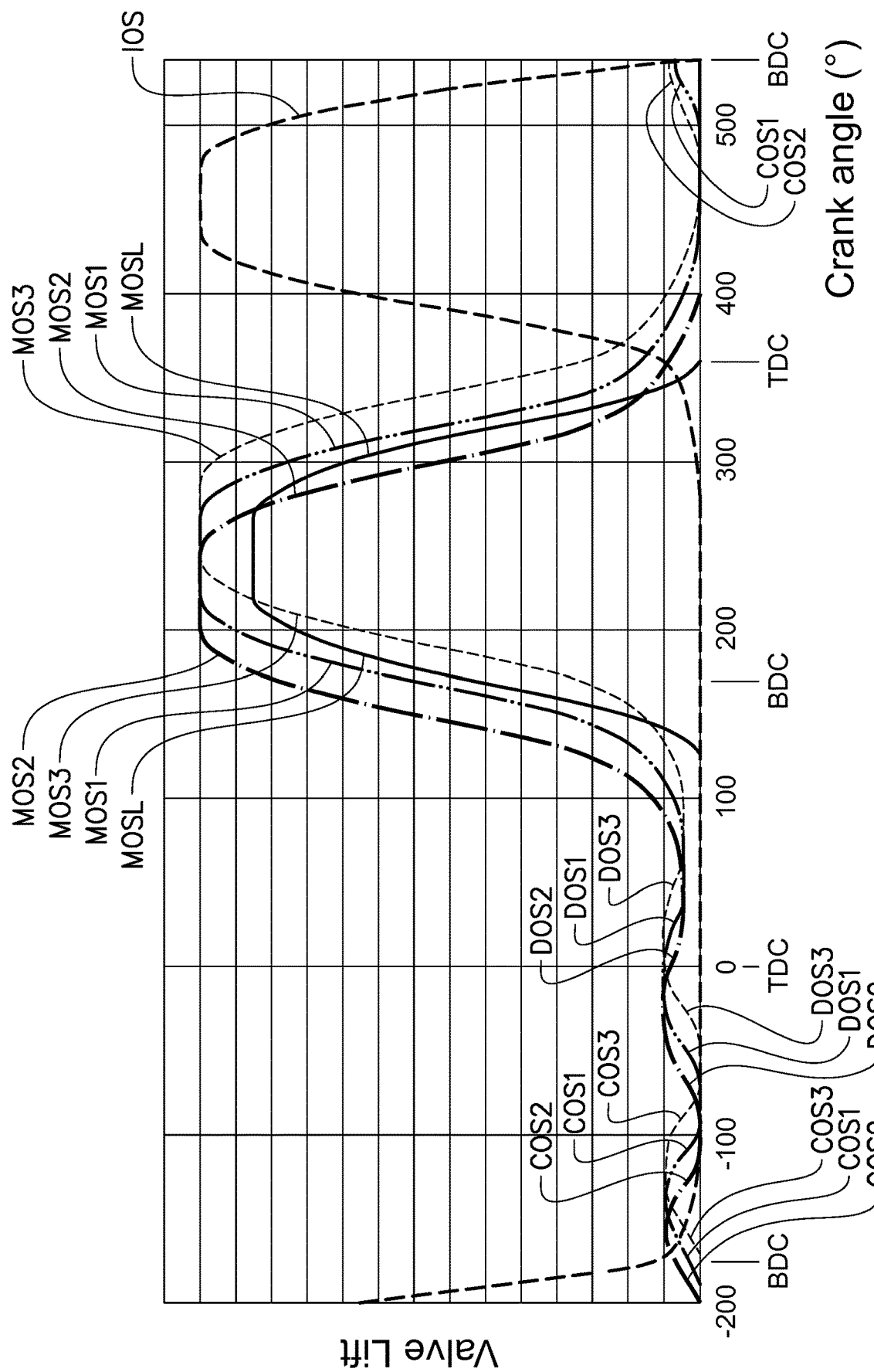
FIG. 4 is a diagram of actuation sequences of exhaust valves shown in FIG. 3 as functions of the crankshaft angle.

Reference is made also to FIG. 4 showing a diagram of actuation sequences of the exhaust valves shown in FIG. 3 as functions of the crankshaft angle. At each cylinder 301, 302 the main nose 804 of the the cam lobe 803 is arranged to actuate the exhaust valves 7 so as to perform in each of a plurality of cycles of the respective cylinder 301, 302 an exhaust valve actuation sequence in the form of a main opening sequence MOSL. The main opening sequence MOSL, which during operations in which the engine propels the vehicle serves to expel exhaust gases from the cylinder, commences in an expansion stroke, and presents a maximum degree of opening of the exhaust valves 7 in an exhaust stroke of the cylinder 301, 302. When the engine propels the vehicle, the rocker arm avoids contact with the decompression nose 805 and the charge nose 806 of the cam lobe as described above.

FIG. 4 also shows an intake valve opening sequence IOS performed by the intake valves at the cylinder.

When engine braking is commenced, the rocker arm is brought into contact with the decompression nose 805 and the charge nose 806 by control of the hydraulic piston 808 of the rocker arm 807 described above. As a result the lift by the main nose is also increased somewhat so that the main opening sequence appears as indicated by the curve MOS1 in FIG. 4.

In addition, the decompression nose 805 provides a decompression opening sequence DOS1, which is commenced in a compression stroke of the cylinder 301. The decompression opening sequence DOS1 serves to release the air compressed during the compression stroke. Thereby, the decompression opening sequence DOS1 serves to avoid a push-back effect, which the compressed air would otherwise have produced at the end of the compression stroke.

Further during engine braking, the charge nose 806 provides a charge opening sequence COS1, which is commenced in a second half of an intake stroke of the cylinder 301. Thereby, when the piston 303 is at its bottom dead centre and the compression stroke is about to start, the exhaust valves 7 open for a short period and the relatively higher pressure in the exhaust guide 501 "charges" the cylinder. As a result of this, the braking effect on the piston 303 during the compression stroke will be considerably higher than without the charge opening sequence COS1. It should be noted that the exhaust valves 7 are fully closed between the charging opening sequence COS1 and the decompression opening sequence DOS1. In alternative embodiments the degree of opening of the exhaust valves 7 may be merely reduced, without involving a complete closure of the exhaust valves, between the charging opening sequence COS1 and the decompression opening sequence DOS1.

It should be noted that in alternative embodiments the charge nose 806 and the decompression nose 805 may be provided on a separate cam lobe adjacent to a cam lobe provided with the main nose 804. Thereby, the rocker arm may be provided in two parts, each following a respective of the cam lobes, although only the part following the cam lobe with the main nose is arranged to actuate the exhaust valves by default. The rocker arm parts may be provided with an engagement mechanism for selectively fixing the rocker arm parts to each other when the charge nose 806 and the decompression nose 805 are to provide the corresponding actuation sequences of the exhaust valves 7. In such embodiments, the lift by the main nose 804 may remain unchanged regardless of the engagements of the charge nose 806 and the decompression nose 805.

By means of said variator 802 (FIG. 2) and the possibility to adjust the phase of the camshaft rotation, the commencement of the exhaust valve actuation sequences MOS1, DOS1, COS1 may be controlled to occur selectively at any crankshaft angle within a non-zero crankshaft angle interval. In fact the entire exhaust valve actuation sequences MOS1, DOS1. COS1 may be moved within the non-zero crankshaft angle interval. Said interval may extend over e.g. 40 crankshaft angle degrees. Other interval sizes are of course possible within the scope of an aspect of the invention. The data storage unit 213 is provided with data correlating values of the engine torque and the engine rotational speed with settings for the phase of the camshaft rotation.

FIG. 4 shows examples of adjusted crankshaft values obtained by the camshaft phase adjustments. By moving the camshaft phase in the direction of rotation of the camshaft 801, the exhaust valve actuation sequences are moved forward in the cycles as indicated by the curves MOS2, DOS2, COS2 in FIG. 4. By moving the camshaft phase opposite to the direction of rotation of the camshaft 801, the exhaust valve actuation sequences are moved backwards in the cycles as indicated by the curves MOS3, DOS3, COS3 in FIG. 4. It should be noted that, apart from the crankshaft angle at which the respective exhaust valve actuation sequence is commenced, the exhaust valve actuation sequences are identical in all cycles. For improved control of the engine braking performance the camshaft phase adjustments are made in dependence on engine parameters as described below.

Figure 5:
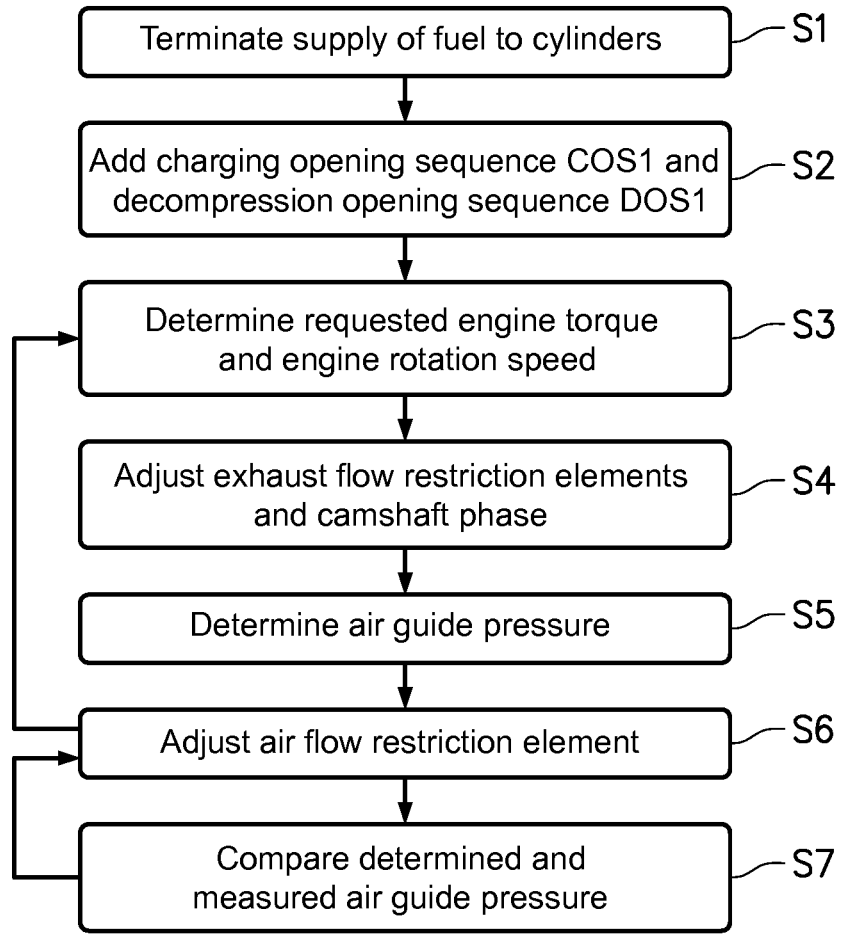
FIG. 5 is a block diagram depicting steps in a method of controlling the engine in FIG. 2.

With reference to FIG. 5 a method of controlling the engine 1 to provide a braking torque will be described.

When the engine braking is commenced, the supply of fuel to the cylinders 301, 302 is terminated S1.

The control valves 809 in the rocker arms 807 at the cylinders 301, 302 are controlled to actuate the hydraulic pistons 808 to engage the rocker arms 807 with the decompression noses 805 and the charge noses 806. Thereby the charging opening sequence COS1 and the decompression opening sequence DOS1 are added S2 to the cycles in the cylinders as described above.

The method also comprises determining S3 the requested engine torque and the engine rotational speed. The control unit 21 determines by means of the data in the data storage unit 213a setting for the first and second exhaust flow restriction elements 601, 602 based on the determined values of the engine torque and the engine rotational speed. The exhaust flow restriction elements 601, 602 are adjusted S4 to the determined setting, so as to provide a restriction of the air flows in the exhaust guides 501, 502 correlated with the determined requested engine torque and engine rotational speed. This adjustment is an open loop adjustment, i.e. although it is updated based on changes in the requested engine torque and engine rotational speed, it is not updated with feedback from any parameter from which the air flow through the cylinders or the cylinder pressure may be determined.

The control unit 21 also determines, based on the requested engine torque and the engine rotational speed, by means of the data in the data storage unit 213, a setting for the camshaft phase. In an open loop control, the control unit 21 sends signals to the variator 802 so as to adjust S4 the phase of the camshaft rotation to adjust the crankshaft angles of the exhaust valve actuation sequences MOS1, DOS1, COS1. Retarding the commencement of the exhaust valve actuation sequences MOS1, DOS1, COS1 will reduce the pressure in the air guide 901 which will reduce the braking torque, and vice versa.

Based on the determined requested engine torque and engine rotational speed, the control unit 21 determines S5 based on the data in the storage unit 213 a desired air guide pressure value. In a closed loop control, the control unit 21 sends signals to the air flow restriction element 903 in the air guide 901 so as to adjust S6 the air flow restriction element 903, based on the desired air guide pressure value and feedback signals from the air guide pressure sensor 211. In the closed loop control, the feedback signals from the air guide pressure sensor 211 are compared S7 to the desired air guide pressure value. Moving the air flow restriction element 903 towards a fully closed position will reduce the pressure in the air guide 901, and vice versa. It should be noted that instead of using a pressure sensor, the air guide pressure may be determined by the control unit 21 based on some other suitable parameter, such as a measured air mass flow in the air guide 901.

It should be noted that as an alternative to the air guide pressure, the closed loop air flow restriction element 903 adjustment may be done based on some other suitable parameter as a feedback parameter, such as the pressure in the exhaust guide 501, 502, or the rotational speed of the turbocharger 4. In the case of the exhaust guide pressure, the feedback signals may be obtained from exhaust guide pressure sensors at the exhaust guides 501, 502. In the case of the turbo charger rotational speed, the feedback signals may be obtained from a speed sensor at the turbocharger 4. In some embodiments, the pressure in the exhaust guide 501, 502, or the rotational speed of the turbocharger 4 may be determined by the control unit 21 based on other suitable parameters. For example, the control unit 21 may the arranged to use mathematical models for the pressure in the exhaust guide 501, 502 and the rotational speed of the turbocharger 4. E.g. the control unit 21 may be arranged to determine these parameters based on the engine speed and the engine braking torque as well as measured values of the air guide pressure and the air mass flow.

Figure 6:
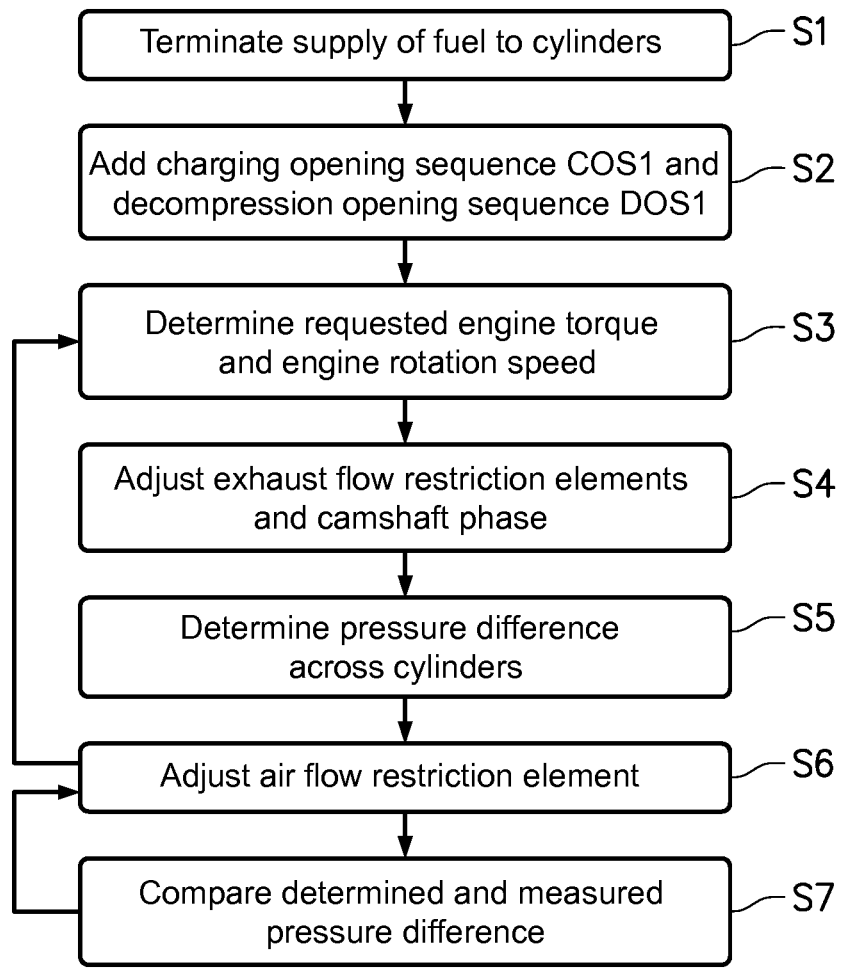
FIG. 6-FIG. 9 are block diagrams depicting steps in methods of controlling an engine according to alternative embodiments of the invention.

With reference is made to FIG. 6, an alternative embodiment of the method will be described. Therein steps are identical to the steps in the embodiment described with reference to FIG. 5, except for the following differences: Based on the determined requested engine torque and engine rotational speed, the control unit 21 determines S5 based on the data in the storage unit 213a desired pressure difference across the cylinders 301, 302. In a closed loop control, the control unit 21 sends signals to the air flow restriction element 903 in the air guide 901 so as to adjust S6 the air flow restriction element 903, based on the desired pressure difference across the cylinders 301, 302 and feedback signals from the air guide pressure sensor 211 and the exhaust guide pressure sensor 214. In the closed loop control, the feedback signals from the air guide pressure sensor 211 and the exhaust guide pressure sensor 214 are compared S7 to the desired pressure difference across the cylinders 301, 302.

Figure 7:
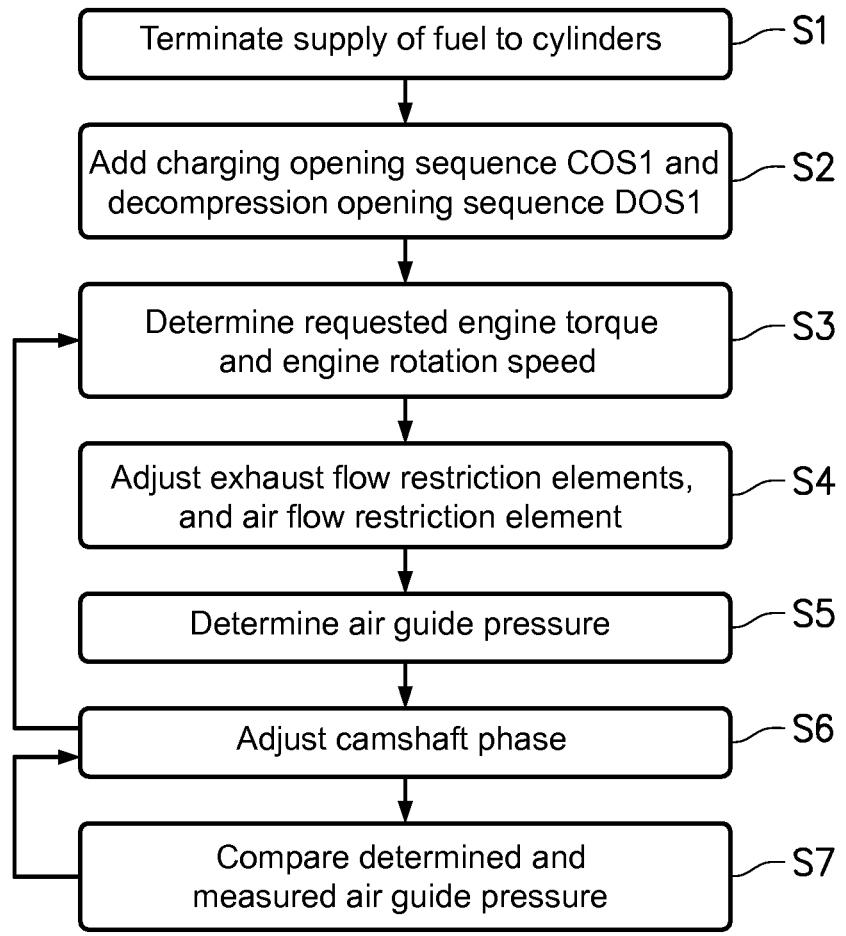
Figure 8:
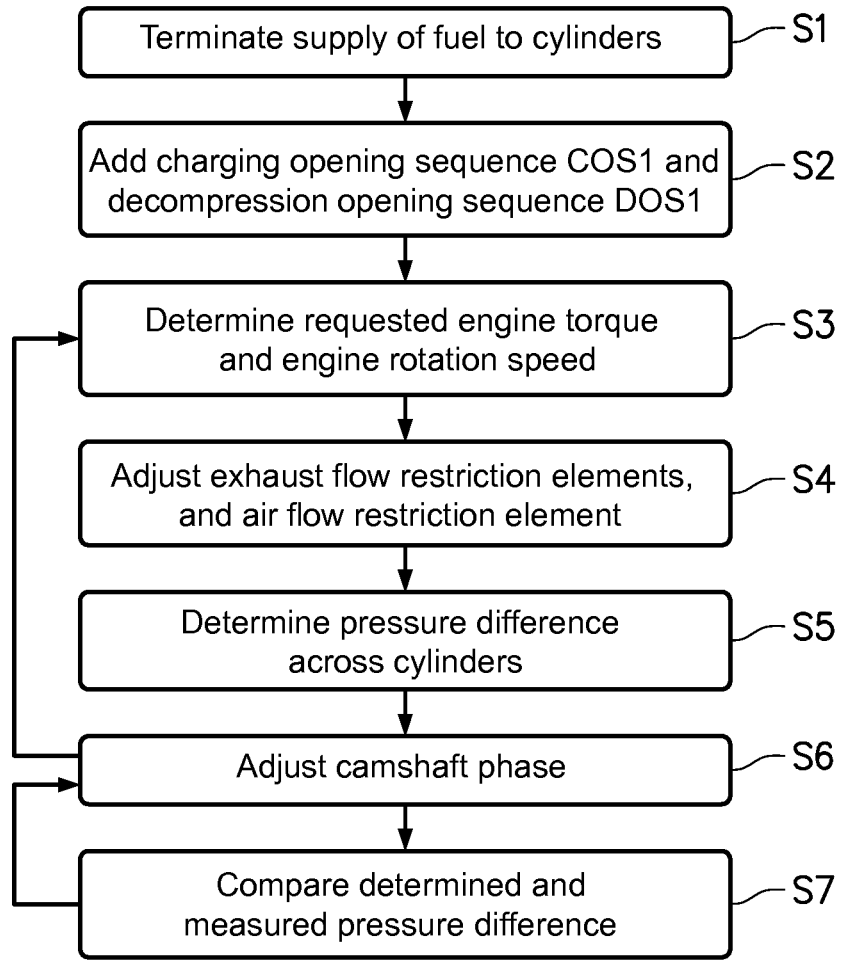

With reference is made to FIG. 7, another embodiment of the method will be described. Therein steps S1-S3 are identical to the steps S1-S3 in the embodiment described with reference to FIG. 5. In the embodiment in FIG. 7, in addition to adjusting S4 the exhaust flow restriction elements 601, 602 in an open loop, the control unit 21 determines S4 by means of the data in the data storage unit 213 a setting for the air flow restriction element 903 based on the determined values of the engine torque and the engine rotational speed. The air flow restriction element 903 is adjusted S4 in an open loop to the determined setting, so as to provide a restriction of the air flows in the air guide 901 correlated with the determined requested engine torque and engine rotational speed.

Further in the embodiment in FIG. 7, based on the determined requested engine torque and engine rotational speed, the control unit 21 determines S5 based on the data in the storage unit 213a desired air guide pressure value. In a closed loop control, the control unit 21 sends signals to the variator 802, based on the desired air guide pressure value and feedback signals from the air guide pressure sensor 211, so as to adjust S6 the phase of the camshaft rotation with corresponding crankshaft angles of the exhaust valve actuation sequences MOS1, DOS1, COS1. In the closed loop control the feedback signals from the air guide pressure sensor 211 are compared S7 to the desired air guide pressure value. Retarding the commencement of the exhaust valve actuation sequences MOS1, DOS1, COS1 will reduce the pressure in the air guide 901, and vice versa.

With reference is made to FIG. 7, an alternative embodiment of the method will be described. Therein steps are identical to the steps in the embodiment described with reference to FIG. 7, except for the following differences. Based on the determined requested engine torque and engine rotational speed, the control unit 21 determines S5 based on the data in the storage unit 213 a desired pressure difference across the cylinders 301, 302. In a closed loop control, the control unit 21 sends signals to the variator 802 so as to adjust S6 the phase of the camshaft rotation with corresponding crankshaft angles of the exhaust valve actuation sequences MOS1, DOS1, COS1, based on the desired pressure difference across the cylinders 301, 302 and feedback signals from the air guide pressure sensor 211 and the exhaust guide pressure sensor 214. In the closed loop control the feedback signals from the air guide pressure sensor 211 and the exhaust guide pressure sensor 214 are compared S7 to the desired pressure difference across the cylinders 301, 302.

It should be noted that in such alternative embodiments, as an alternative to the air guide pressure, the camshaft phase adjustment may be done based on some other suitable feedback parameter, such as the rotational speed of the turbocharger 4.

In alternative embodiments of the method, the control unit 21 determines based on the determined values of the engine torque and the engine rotational speed and by means of the data in the data storage unit 213, a value of the phase of the camshaft rotation with corresponding crankshaft angles of the exhaust valve actuation sequences MOS1, DOS1, COS1. The control unit 21 sends signals to the variator 802 so as to adjust the camshaft phase according to the determined phase value. The camshaft phase is adjusted with an open loop adjustment based on changes in the requested engine torque and engine rotational speed. In addition, the control unit 21 determines by means of the data in the data storage unit 213a setting for the air flow restriction element 903 based on the determined values of the engine torque and the engine rotational speed. The air flow restriction element 903 is adjusted in an open loop to the determined setting, so as to provide a restriction of the air flows in the air guide 901 correlated with the determined requested engine torque and engine rotational speed.

Further in such alternative embodiments, based on the determined requested engine torque and engine rotational speed, the control unit 21 determines based on the data in the storage unit 213 a desired air guide pressure value. Alternatively, a desired pressure difference across the cylinders 301, 302 may be determined as described above. In a closed loop control, the control unit 21 sends signals, based on the desired air guide value and feedback signals from the air guide pressure sensor 211, so as to adjust the first and second exhaust flow restriction elements 601, 602.

It should be noted that in such alternative embodiments, as an alternative to the air guide pressure, the exhaust flow restriction element adjustment may be done based on some other suitable parameter, such as the pressure in the exhaust guide 501, 502, or the rotational speed of the turbocharger 4.

In other alternative embodiments, at least two of, or all of the exhaust flow restriction element adjustments, the air flow restriction element adjustments, and the camshaft phase adjustments may be done in a closed loop control. Such closed loop control may be arranged so as for the actual air guide pressure and the actual exhaust guide pressure to equal desired values of these parameters. The desired air guide pressure and the desired exhaust guide pressure may be obtained from determined values of the engine speed and the requested engine torque, and correlation data stored in the data storage unit. In further alternative embodiments, the exhaust flow restriction element adjustments, the air flow restriction element adjustments, and/or the camshaft phase adjustments may be done in a closed loop control so that the actual exhaust guide pressure and the turbocharger speed equal desired values of these parameters. The desired exhaust guide pressure and the desired turbocharger speed may be obtained from determined values of the engine speed and the requested engine torque, and correlation data stored in the data storage unit.

Figure 9:
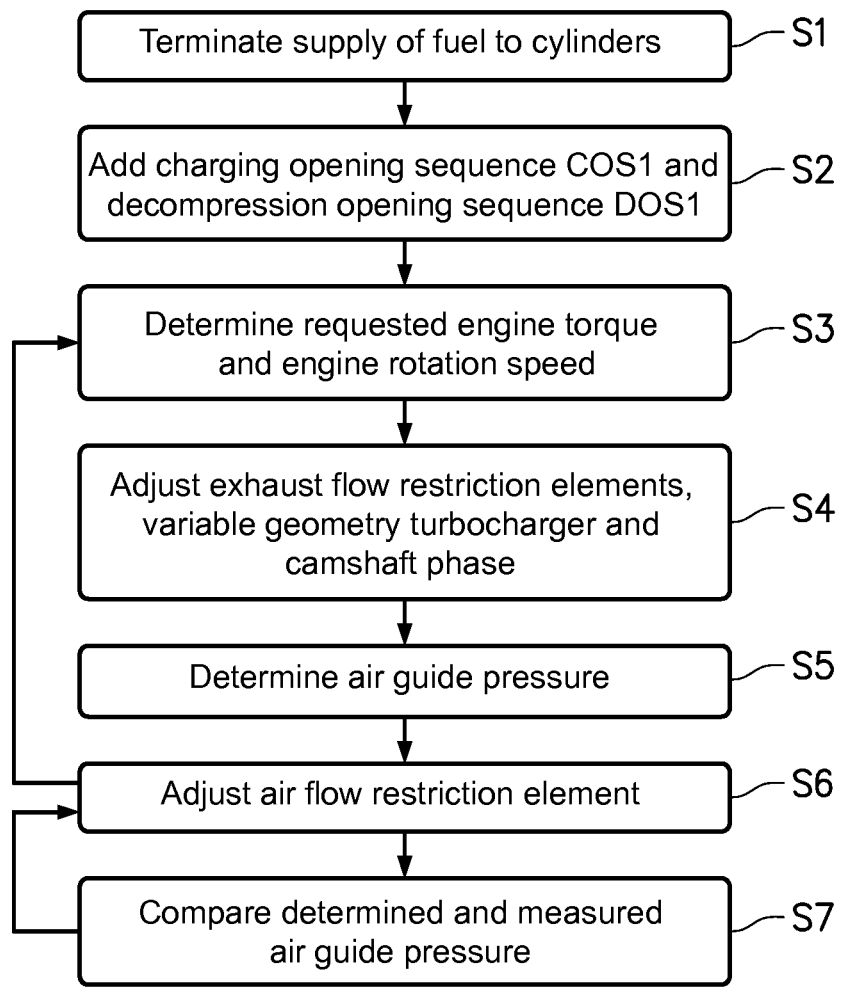

Reference is made to FIG. 9. In alternative embodiments of the engine, the turbocharger 4 is a variable geometry turbocharger, whereby the turbocharger 4 provides at the turbine 401 an adjustable flow restriction function in addition to the flow restriction function of the exhaust flow restriction elements 601, 602. FIG. 9 depicts steps in a method in such alternative embodiments of the engine.

Similarly to the method described with reference to FIG. 5, when the engine braking is commenced, the supply of fuel to the cylinders 301, 302 is terminated S1, and the control valves 809 in the rocker arms 807 at the cylinders 301, 302 are controlled to actuate the hydraulic pistons 808 to engage the rocker arms 807 with the decompression noses 805 and the charge noses 806 whereby the charging opening sequence COS1 and the decompression opening sequence DOS1 are added S2 to the cycles in the cylinders.

The requested engine torque and the engine rotational speed are determined S3. The control unit 21 determines by means of the data in the data storage unit 213 a setting for the variable geometry turbo charger 4 as well as a setting for the first and second exhaust flow restriction elements 601, 602 based on the determined values of the engine torque and the engine rotational speed. The variable geometry turbo charger 4 and the exhaust flow restriction elements 601, 602 are adjusted S4 to the determined setting, so as to provide a restriction of the air flows in the exhaust guides 501, 502 correlated with the determined requested engine torque and engine rotational speed. This adjustment is an open loop adjustment.

As in FIG. 5, the control unit 21 also determines, based on the requested engine torque and the engine rotational speed, by means of the data in the data storage unit 213, a setting for the camshaft phase. In an open loop control, the control unit 21 sends signals to the variator 802 so as to adjust S4 the phase of the camshaft rotation to adjust the crankshaft angles of the exhaust valve actuation sequences MOS1, DOS1, COS1.

Similarly to the method described with reference to FIG. 5, based on the determined requested engine torque and engine rotational speed, the control unit 21 determines S5 based on the data in the storage unit 213a desired air guide pressure value. In a closed loop control, the control unit 21 sends signals to the air flow restriction element 903 in the air guide 901 so as to adjust S6 the air flow restriction element 903, based on the desired air guide value and feedback signals from the air guide pressure sensor 211. In the closed loop control, the feedback signals from the air guide pressure sensor 211 are compared S7 to the desired air guide pressure value. As an alternative to the air guide pressure, the air flow restriction element 903 adjustment may be done based on some other suitable parameter, such as the pressure in the exhaust guide 501, 502, or the rotational speed of the turbocharger 4.

In an engine with a variable geometry turbocharger, alternative embodiments of the method may include determining based on the determined values of the engine torque and the engine rotational speed and by means of the data in the data storage unit 213, settings of the first and second exhaust flow restriction elements 601, 602 and the air flow restriction element 903, and a value of the phase of the camshaft rotation. The control unit 21 may send signals to the exhaust flow restriction actuation assembly so as to adjust the exhaust flow restriction elements 601, 602 according to the determined settings, the air flow restriction element 903 so as to adjust the latter, and to the variator 802 so as to adjust the camshaft phase according to the determined phase value. The exhaust flow restriction elements, the air flow restriction element 903 and the camshaft phase may be adjusted with an open loop adjustment based on changes in the requested engine torque and engine rotational speed.

Further, in such alternative embodiments, based on the determined requested engine torque and engine rotational speed, the control unit 21 may determine based on the data in the storage unit 213 a desired air guide pressure value. In a closed loop control, the control unit 21 may send signals, based on the desired air guide value and feedback signals from the air guide pressure sensor 211, so as to adjust the variable geometry turbocharger 4. As an alternative to the air guide pressure, the variable geometry turbocharger adjustment may be done based on some other suitable parameter, such as the pressure in the exhaust guide 501, 502, or the rotational speed of the turbocharger 4.

In an engine with a variable geometry turbocharger, still further alternative embodiments of the method may include determining based on the determined values of the engine torque and the engine rotational speed and by means of the data in the data storage unit 213, a setting of the variable geometry turbocharger 4, a setting of the air flow restriction element 903, and a value of the phase of the camshaft rotation, and adjusting the variable geometry turbocharger 4 and the air flow restriction element 903 according to the determined settings and adjusting the camshaft phase according to the determined phase value. The variable geometry turbocharger, the air flow restriction element 903, and the camshaft phase may be adjusted with an open loop adjustment based on changes in the requested engine torque and engine rotational speed.

In addition, in such still further alternative embodiments, based on the determined requested engine torque and engine rotational speed, the control unit 21 may determine based on the data in the storage unit 213 a desired air guide pressure value. In a closed loop control, the control unit 21 may send signals, based on the desired air guide value and feedback signals from the air guide pressure sensor 211, so as to adjust the exhaust flow restriction elements 601, 602. As an alternative to the air guide pressure, the exhaust flow restriction element adjustments may be done based on some other suitable parameter, such as the pressure in the exhaust guide 501, 502, or the rotational speed of the turbocharger 4.

Figure 10:
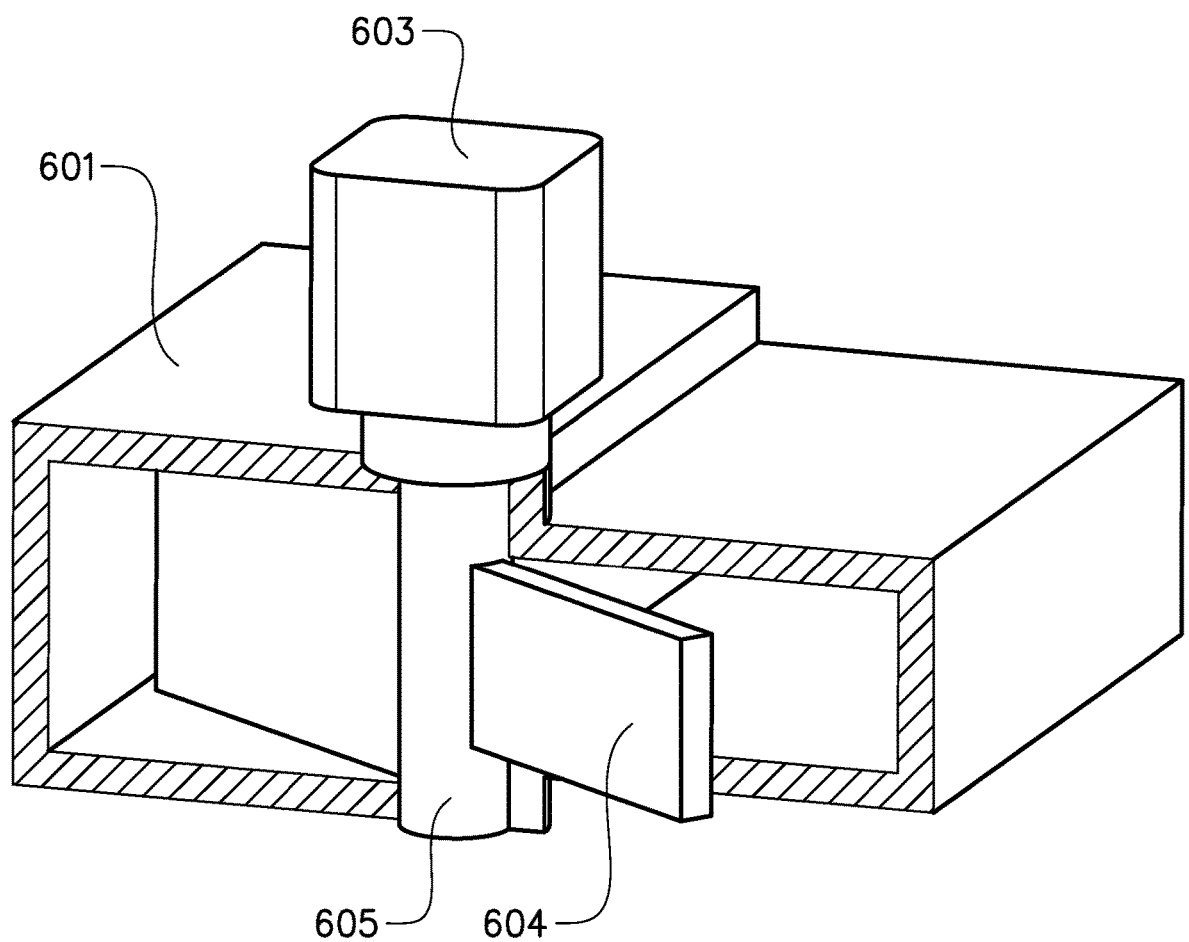
FIG. 10 shows an exhaust flow restriction element for an engine according to an additional embodiment of the invention.

FIG. 10 shows an exhaust flow restriction element 601 for an engine according to an additional embodiment of the invention. The exhaust flow restriction element 601 is a butterfly valve with a flap 604. An exhaust flow restriction actuation assembly 603, comprising a stepper motor, a brushless motor or a pneumatic motor, is provided to adjust the exhaust flow restriction element 601, i.e. to adjust the angular position of the flap 604 around an axle 605. The flap 604 is non-symmetric, i.e. the extension of the flap is larger on one side of the axle 605 than on the other side. As a result, the exhaust flow restriction element is arranged to assume, upon a fault in the exhaust flow restriction actuation assembly 603, a position in which the exhaust flow restriction element does not restrict or block the flow through the exhaust guide.

Figure 11:
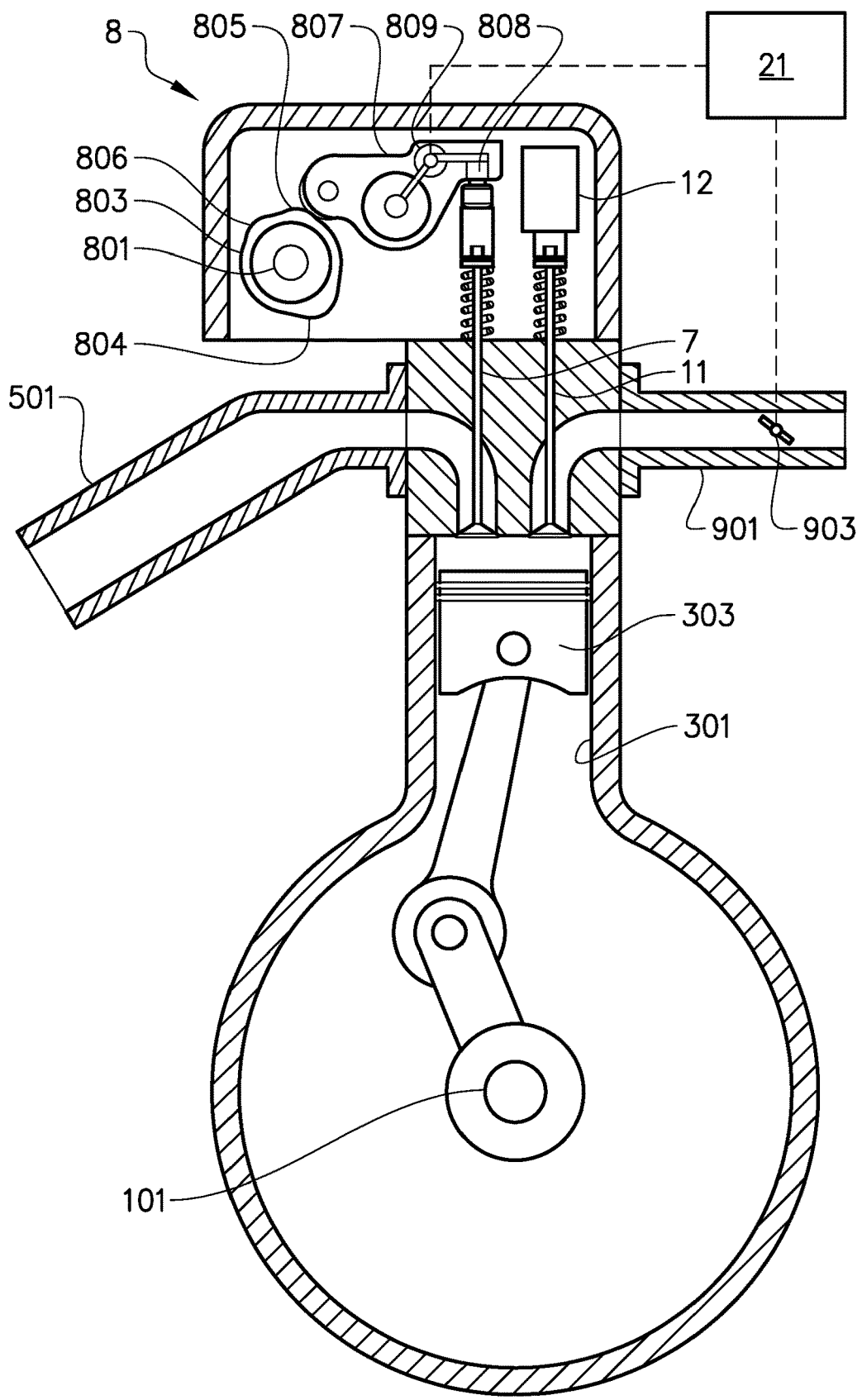
FIG. 11 is a view of a vertical cross-section at a cylinder of an engine according to a further embodiment of the invention.

Reference is made also to FIG. 11 showing a cross-section through a cylinder in an engine according to a further embodiment of the invention. The embodiment in FIG. 11 shares features with the embodiment described above with reference to FIG. 3, except for the following distinction: In the embodiment in FIG. 11 there is no adjustable exhaust flow restriction element 601 in the exhaust guide 501.

Figure 12:
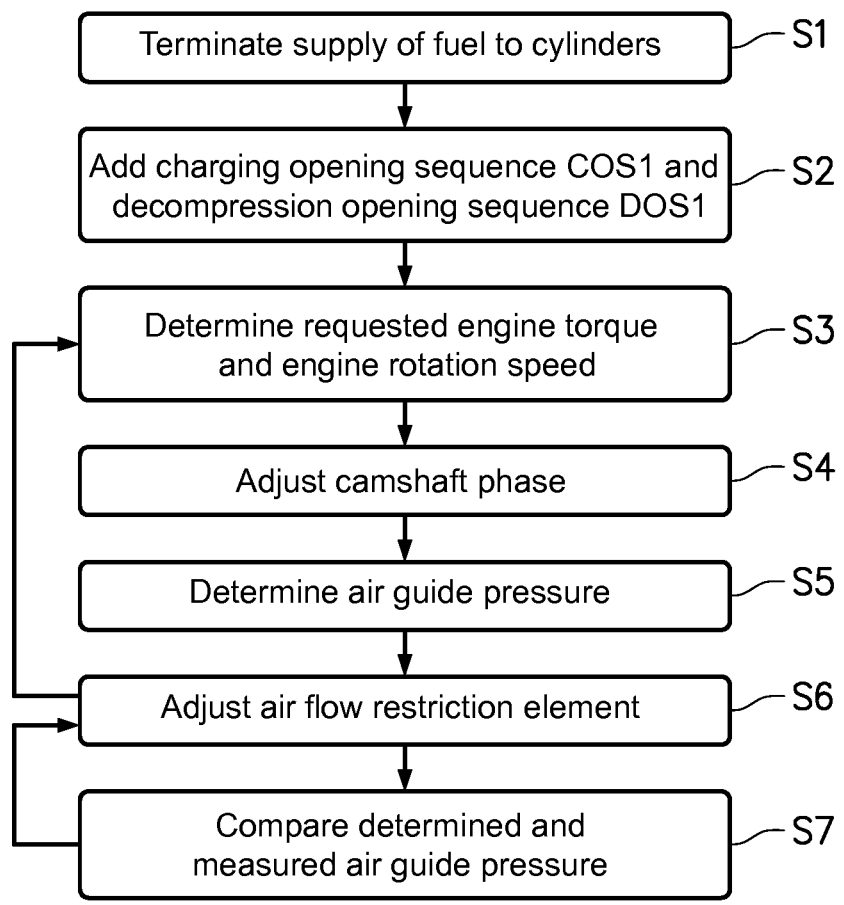
FIG. 12 is a block diagram depicting steps in a method of controlling the engine in FIG. 11.

FIG. 12 depicts steps in a method of controlling the engine in FIG. 11. The method shares features with the method in FIG. 5, expect for the distinction that the method does not include adjusting any exhaust flow restriction element. Similarly to the method in FIG. 5, the method in FIG. 12 comprises determining, based on the requested engine torque and the engine rotational speed, by means of the data in the data storage unit 213, a setting for the camshaft phase, and in an open loop control, adjusting S4 die phase of the camshaft rotation to adjust the crankshaft angles of the exhaust valve actuation sequences MOS1, DOS1, COS1 (FIG. 4). In a closed loop control, the air flow restriction element 903 is adjusted based on the desired air guide pressure value and feedback signals from the air guide pressure sensor 211. In the closed loop control, the feedback signals from the air guide pressure sensor 211 are compared S7 to the desired air guide pressure value. Alternatively, as in FIG. 6, the air flow restriction element 903 may be adjusted, based on a desired pressure difference across the cylinders 301, 302 and feedback signals from the air guide pressure sensor 211 and an exhaust guide pressure sensor.

It is to be understood that the present invention is not limited to the embodiments described above and illustrated in the drawings; rather, the skilled person will recognize that many changes and modifications may be made within the scope of the appended claims.

The invention claimed is:

1. A method of controlling an internal combustion engine (1) in a vehicle comprising a cylinder, a fuel system for supplying fuel to the cylinder, an air guide arranged to guide an air flow to the cylinder, an exhaust guide arranged to guide a gas flow from the cylinder, an exhaust valve arranged to control a communication between the cylinder and the exhaust guide, the method comprising
   controlling the engine to provide a braking torque, the control comprising,
   terminating the supply of fuel to the cylinder,
   restricting the flow through the exhaust guide,
   restricting the flow through the air guide,
   performing in each of a plurality of cycles of the cylinder an exhaust valve actuation sequence,
   determining a value of at least one engine parameter affecting the pressure in the cylinder and/or the air mass flow through the cylinder, and
   in dependence on at least one of the at least one determined engine parameter value adjusting the restriction of the flow through the air guide,
   wherein the control of the engine to provide a braking torque also comprises in dependence on at least one of the at least one determined engine parameter value adjusting the timing of a commencement of the exhaust valve actuation sequence to occur selectively at any crankshaft angle within a non-zero crankshaft angle interval.

2. A method according to claim 1, wherein each of the at least one the engine parameter is one of the engine rotational speed, a requested engine braking torque, a current engine braking torque, a pressure in the air guide, a rotational speed of a turbocharger of the engine, and a pressure in the exhaust guide.

3. A method according to claim 1, wherein adjusting the restriction of the flow through the air guide comprises adjusting a throttle valve in the air guide.

4. A method according to claim 1, wherein the adjustment of the restriction of the flow through the air guide is a closed loop adjustment.

5. A method according to claim 4, wherein a pressure in the air guide is a feedback parameter in the closed loop adjustment.

6. A method according to claim 4, wherein a pressure in the exhaust guide is a feedback parameter in the closed loop adjustment.

7. A method according to claim 1, wherein adjusting the timing of the commencement of the exhaust valve actuation sequence comprises adjusting the crankshaft angle at which the exhaust valve actuation sequence is commenced.

8. A method according to claim 1, wherein the adjustment of the timing of the commencement of the exhaust valve actuation sequence is an open loop adjustment.

9. A method according to claim 1, wherein the exhaust valve actuation sequence comprises a decompression opening sequence commenced in a compression stroke of the cylinder.

10. A method according to claim 1, wherein the exhaust valve actuation sequence comprises a charging opening sequence of the exhaust valve commenced in a second half of an intake stroke or a first half of a compression stroke of the cylinder.

11. A method according to claim 1, comprising in dependence on at least one of the at least one determined engine parameter value adjusting the restriction of the flow through the exhaust guide.

12. A method according to claim 11, wherein the adjustment of the restriction of the flow through the exhaust guide is an open loop adjustment.

13. A method according to claim 1, wherein restricting the flow through the exhaust guide comprises adjusting a throttle valve in the exhaust guide, and/or adjusting a flow adjustment function at a turbine of a variable geometry turbocharger of the engine, wherein the exhaust guide is arranged to guide the gas flow from the cylinder to the turbine.

14. A computer comprising a computer program for causing an internal combustion engine to perform the steps of claim 1 when the program is run on the computer.

15. A non-transitory computer readable medium carrying a computer program for causing an internal combustion engine to perform the steps of claim 1 when the program product is run on a computer.

16. A control unit configured to perform the steps of the method according to claim 1.

* * * * *